United States Patent
Endoh et al.

(10) Patent No.: US 10,784,498 B2
(45) Date of Patent: Sep. 22, 2020

(54) POSITIVE ELECTRODE, BATTERY, BATTERY PACK, ELECTRONIC DEVICE, ELECTRIC VEHICLE, ELECTRICITY STORAGE DEVICE, AND ELECTRIC POWER SYSTEM

(71) Applicant: Murata Manufacturing Co., Ltd., Kyoto (JP)

(72) Inventors: Kazuaki Endoh, Kanagawa (JP); Kazunari Motohashi, Kanagawa (JP); Naoki Hayashi, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/316,259

(22) PCT Filed: May 18, 2015

(86) PCT No.: PCT/JP2015/002479
§ 371 (c)(1),
(2) Date: Dec. 5, 2016

(87) PCT Pub. No.: WO2015/198521
PCT Pub. Date: Dec. 30, 2015

(65) Prior Publication Data
US 2017/0149049 A1    May 25, 2017

(30) Foreign Application Priority Data

Jun. 26, 2014 (JP) .................................. 2014-131757

(51) Int. Cl.
*H01M 4/131* (2010.01)
*H01M 4/505* (2010.01)
(Continued)

(52) U.S. Cl.
CPC ............... *H01M 4/131* (2013.01); *B60K 6/46* (2013.01); *B60L 7/10* (2013.01); *B60L 50/64* (2019.02);
(Continued)

(58) Field of Classification Search
CPC ...... H01M 4/131; H01M 4/134; H01M 4/505; H01M 4/525; H01M 4/623; H01M 4/625;
(Continued)

(56) References Cited

U.S. PATENT DOCUMENTS

| 4,112,204 A | * | 9/1978 | McRae | ................. H01M 2/065 174/50.61 |
| 5,647,965 A | * | 7/1997 | Crose | ..................... B03C 5/024 204/551 |

(Continued)

FOREIGN PATENT DOCUMENTS

| JP | 2009-110942 A | 5/2009 |
| JP | 2012-185913 A | 9/2012 |

(Continued)

OTHER PUBLICATIONS

Office Action for JP Patent Application No. 2016-528994, dated Jul. 3, 2018, 02 pages of Office Action and 02 pages of English Translation.

(Continued)

*Primary Examiner* — Behrang Badii
*Assistant Examiner* — Daniel L Greene
(74) *Attorney, Agent, or Firm* — Chip Law Group

(57) ABSTRACT

A positive electrode contains a first active material and a second active material. The first active material and the second active material each contain a lithium composite oxide containing at least manganese (Mn), nickel (Ni), and cobalt (Co) as transition metals. The first active material has a particulate shape. An average porosity V1 in a particle of (Continued)

the first active material satisfies $10[\%] \leq V1 \leq 30[\%]$. An average particle diameter D1 of the first active material satisfies $6 \, [\mu m] \leq D1 \leq 20 \, [\mu m]$. The second active material has a particulate shape. An average porosity V2 in a particle of the second active material satisfies $0[\%] \leq V2 \leq 10[\%]$. An average particle diameter D2 of the second active material satisfies $1 \, [\mu m] \leq D2 \leq 6 \, [\mu m]$.

15 Claims, 7 Drawing Sheets

(51) Int. Cl.
| | | |
|---|---|---|
| H01M 4/525 | (2010.01) | |
| H01M 4/36 | (2006.01) | |
| B60L 50/64 | (2019.01) | |
| B60W 20/14 | (2016.01) | |
| B60K 6/46 | (2007.10) | |
| B60L 7/10 | (2006.01) | |
| B60W 30/18 | (2012.01) | |
| H01M 2/16 | (2006.01) | |
| H01M 4/134 | (2010.01) | |
| H01M 4/62 | (2006.01) | |
| H01M 10/0525 | (2010.01) | |
| H01M 10/0563 | (2010.01) | |
| H01M 10/0569 | (2010.01) | |
| H01M 10/42 | (2006.01) | |
| H01M 4/02 | (2006.01) | |

(52) U.S. Cl.
CPC ...... *B60W 20/14* (2016.01); *B60W 30/18127* (2013.01); *H01M 2/1653* (2013.01); *H01M 4/134* (2013.01); *H01M 4/366* (2013.01); *H01M 4/505* (2013.01); *H01M 4/525* (2013.01); *H01M 4/623* (2013.01); *H01M 4/625* (2013.01); *H01M 10/0525* (2013.01); *H01M 10/0563* (2013.01); *H01M 10/0569* (2013.01); *H01M 10/425* (2013.01); *H01M 2004/021* (2013.01); *H01M 2004/027* (2013.01); *H01M 2004/028* (2013.01); *H01M 2010/4271* (2013.01); *H01M 2220/10* (2013.01); *H01M 2220/20* (2013.01); *H01M 2220/30* (2013.01); *H01M 2300/002* (2013.01); *H01M 2300/004* (2013.01); *H01M 2300/0034* (2013.01); *Y02E 60/122* (2013.01); *Y02T 10/705* (2013.01); *Y02T 10/7011* (2013.01); *Y10S 903/903* (2013.01)

(58) Field of Classification Search
CPC ........... H01M 2/1653; H01M 10/0525; H01M 10/0563; H01M 10/0569; H01M 10/425; B60W 20/14; B60W 30/18127; B60K 6/46; B60L 7/10; B60L 1/1809
See application file for complete search history.

(56) References Cited

U.S. PATENT DOCUMENTS

| | | | | |
|---|---|---|---|---|
| 6,489,026 | B1* | 12/2002 | Nishimura | B82Y 30/00 |
| | | | | 423/447.1 |
| 6,669,961 | B2* | 12/2003 | Kim | A61K 9/1694 |
| | | | | 424/400 |
| 2007/0111055 | A1* | 5/2007 | Katikaneni | B01J 35/026 |
| | | | | 429/423 |
| 2010/0068623 | A1* | 3/2010 | Braun | C25F 3/02 |
| | | | | 429/219 |
| 2010/0225266 | A1* | 9/2010 | Hartman | B60L 11/1822 |
| | | | | 320/101 |
| 2013/0052529 | A1* | 2/2013 | Ohkubo | B82Y 30/00 |
| | | | | 429/211 |
| 2013/0216907 | A1* | 8/2013 | Rayner | B22F 9/04 |
| | | | | 429/211 |
| 2014/0272578 | A1* | 9/2014 | Xiao | C01B 33/021 |
| | | | | 429/218.1 |
| 2014/0322576 | A1* | 10/2014 | Okumura | H01M 4/505 |
| | | | | 429/94 |
| 2015/0044534 | A1* | 2/2015 | Kimura | H01M 4/131 |
| | | | | 429/94 |
| 2016/0293957 | A1* | 10/2016 | Okae | H01M 4/13 |
| 2016/0359197 | A1* | 12/2016 | Watarai | H01M 10/0567 |

FOREIGN PATENT DOCUMENTS

| | | |
|---|---|---|
| JP | 2013-065468 A | 4/2013 |
| JP | 2013-214394 A | 10/2013 |
| JP | 2015-026594 A | 2/2015 |
| WO | 2013/191179 A1 | 12/2013 |

OTHER PUBLICATIONS

Office Action for CN Patent Application No. 201580032915.3, dated Mar. 28, 2019, 03 pages of Office Action and 05 pages of English Translation.

Office Action for CN Patent Application No. 201580032915.3, dated Sep. 29, 2018, 06 pages of Office Action and 04 pages of English Translation.

Office Action for KR Patent Application No. 10-2016-7035005, dated Dec. 4, 2019, 05 pages of Office Action and 03 pages of English Translation.

* cited by examiner

US 10,784,498 B2

POSITIVE ELECTRODE, BATTERY, BATTERY PACK, ELECTRONIC DEVICE, ELECTRIC VEHICLE, ELECTRICITY STORAGE DEVICE, AND ELECTRIC POWER SYSTEM

CROSS REFERENCE TO RELATED APPLICATIONS

This application is a U.S. National Phase of International Patent Application No. PCT/JP2015/002479 filed on May 18, 2015, which claims priority benefit of Japanese Patent Application No. JP 2014-131757 filed in the Japan Patent Office on Jun. 26, 2014. Each of the above-referenced applications is hereby incorporated herein by reference in its entirety.

TECHNICAL FIELD

The present technology relates to a positive electrode, a battery, a battery pack, an electronic device, an electric vehicle, an electricity storage device, and an electric power system. Specifically, the present technology relates to a positive electrode containing a lithium composite oxide.

BACKGROUND ART

Due to remarkable development of a mobile electronic technology in recent years, an electronic device such as a mobile phone or a notebook computer is recognized as a basic technology supporting an advanced information society. In addition, research and development about sophistication of these electronic devices have been made energetically, and consumption electric power of these electronic devices has been increasing proportionally. On the other hand, it is required for these electronic devices to drive for a long time, and a secondary battery having a high energy density as a driving power source is desired inevitably. In addition, a battery having a higher energy density is more desirable from a viewpoint of an occupied volume of a battery incorporated in an electronic device, a mass thereof, or the like. Therefore, at present, a lithium-ion secondary battery having an excellent energy density is incorporated in almost every device.

In recent years, various studies have been made in order to further improve an energy density of a lithium-ion secondary battery. One of these studies is a study on a high capacity positive electrode material. As the high capacity positive electrode material, a lithium-excess $Li_2MnO_3$—$LiMO_2$ (M=Co, Ni, or the like) solid solution has attracted attention.

Patent Document 1 describes use of a compound represented by a general formula $Li_{1+n}MXO_4$ (n is the number of 0 to 1, M is at least one element selected from the group consisting of Fe, Co, Ni, Mn, and Ti, and X is P or Si) as a positive electrode active material. In addition, Patent Document 1 describes that a porosity of a positive electrode active material particle is 6% by volume or more.

Patent Document 2 describes use of a compound represented by a general formula $Li_{2-0.5x}Mn_{1-x}M_{1.5x}O_3$ (M represents $Ni_\alpha Co_\beta Mn_\gamma M^1_\delta$ ($M^1$ represents at least one selected from the group consisting of aluminum (Al), iron (Fe), copper (Cu), magnesium (Mg), and titanium (Ti), and $\alpha$, $\beta$, $\gamma$, and $\delta$ satisfy $0<\alpha\leq0.5$, $0\leq\beta\leq0.33$, $0<\gamma\leq0.5$, $0<\delta\leq0.1$, and $\alpha+\beta+\gamma+\delta=1$), and x satisfies $0<x<1.00$, preferably $0.1\leq x\leq0.5$) and obtained by immersing a layered transition metal oxide having a crystal structure belonging to a space group C2/m in an acidic solution.

CITATION LIST

Patent Document

Patent Document 1: JP 2013-214394 A
Patent Document 2: JP 2012-185913 A

SUMMARY OF THE INVENTION

Problems to be Solved by the Invention

Patent Document 1 specifies a porosity. However, a filling property may be reduced by some pore positions or pore shapes, and a volume energy density may be thereby reduced. In addition, in Patent Document 2, a reaction resistance on a surface of an active material particle can be improved, but it is difficult to improve a diffusion resistance of lithium (Li) into a particle. Therefore, improvement of a load characteristic cannot be expected.

An object of the present technology is to provide a positive electrode, a battery, a battery pack, an electronic device, an electric vehicle, an electricity storage device, and an electric power system, capable of achieving both a volume energy density and a load characteristic.

Solutions to Problems

In order to solve the above problem, a first invention relates to a positive electrode containing a first active material and a second active material, in which the first active material and the second active material each contain a lithium composite oxide containing at least manganese (Mn), nickel (Ni), and cobalt (Co) as transition metals, the first active material has a particulate shape, an average porosity V1 in a particle of the first active material satisfies $10[\%]\leq V1\leq30[\%]$, an average particle diameter D1 of the first active material satisfies $6\,[\mu m]\leq D1\leq20\,[\mu m]$, the second active material has a particulate shape, an average porosity V2 in a particle of the second active material satisfies $0[\%]\leq V2\leq10[\%]$, and an average particle diameter D2 of the second active material satisfies $1\,[\mu m]\leq D2\leq6\,[\mu m]$.

A second invention relates to a battery containing a positive electrode, a negative electrode, and an electrolyte, in which the positive electrode contains a first active material and a second active material, the first active material and the second active material each contain a lithium composite oxide containing at least manganese (Mn), nickel (Ni), and cobalt (Co) as transition metals, the first active material has a particulate shape, an average porosity V1 in a particle of the first active material satisfies $10[\%]\leq V1\leq30[\%]$, an average particle diameter D1 of the first active material satisfies $6\,[\mu m]\leq D1\leq20\,[\mu m]$, the second active material has a particulate shape, an average porosity V2 in a particle of the second active material satisfies $0[\%]\leq V2\leq10[\%]$, and an average particle diameter D2 of the second active material satisfies $1\,[\mu m]\leq D2\leq6\,[\mu m]$.

A third invention relates to a battery pack provided with a battery containing a positive electrode, a negative electrode, and an electrolyte, in which the positive electrode contains a first active material and a second active material, the first active material and the second active material each contain a lithium composite oxide containing at least manganese (Mn), nickel (Ni), and cobalt (Co) as transition metals, the first active material has a particulate shape, an average porosity V1 in a particle of the first active material satisfies 10[%]≤V1≤30[%], an average particle diameter D1 of the first active material satisfies 6 [μm]≤D1≤20 [μm], the second active material has a particulate shape, an average porosity V2 in a particle of the second active material satisfies 0[%]≤V2≤10[%], and an average particle diameter D2 of the second active material satisfies 1 [μm]≤D2≤6 [μm].

A fourth invention relates to an electronic device provided with a battery containing a positive electrode, a negative electrode, and an electrolyte, in which the positive electrode contains a first active material and a second active material, the first active material and the second active material each contain a lithium composite oxide containing at least manganese (Mn), nickel (Ni), and cobalt (Co) as transition metals, the first active material has a particulate shape, an average porosity V1 in a particle of the first active material satisfies 10[%]≤V1≤30[%], an average particle diameter D1 of the first active material satisfies 6 [μm]≤D1≤20 [μm], the second active material has a particulate shape, an average porosity V2 in a particle of the second active material satisfies 0[%]≤V2≤10[%], an average particle diameter D2 of the second active material satisfies 1 [μm]≤D2≤6 [μm], and the electronic device receives electric power from the battery.

A fifth invention relates to an electric vehicle provided with a battery, a converter for converting electric power supplied from the battery into a driving force of a vehicle, and a controller for performing information processing on vehicle control on the basis of information on the battery, in which the battery contains a positive electrode, a negative electrode, and an electrolyte, the positive electrode contains a first active material and a second active material, the first active material and the second active material each contain a lithium composite oxide containing at least manganese (Mn), nickel (Ni), and cobalt (Co) as transition metals, the first active material has a particulate shape, an average porosity V1 in a particle of the first active material satisfies 10[%]≤V1≤30[%], an average particle diameter D1 of the first active material satisfies 6 [μm]≤D1≤20 [μm], the second active material has a particulate shape, an average porosity V2 in a particle of the second active material satisfies 0[%]≤V2≤10[%], and an average particle diameter D2 of the second active material satisfies 1 [μm]≤D2≤6 [μm].

A sixth invention relates to an electricity storage device provided with a battery containing a positive electrode, a negative electrode, and an electrolyte, in which the positive electrode contains a first active material and a second active material, the first active material and the second active material each contain a lithium composite oxide containing at least manganese (Mn), nickel (Ni), and cobalt (Co) as transition metals, the first active material has a particulate shape, an average porosity V1 in a particle of the first active material satisfies 10[%]≤V1≤30[%], an average particle diameter D1 of the first active material satisfies 6 [μm]≤D1≤20 [μm], the second active material has a particulate shape, an average porosity V2 in a particle of the second active material satisfies 0[%]≤V2≤10[%], an average particle diameter D2 of the second active material satisfies 1 [μm]≤D2≤6 [μm], and the electricity storage device supplies electric power to an electronic device connected to the battery.

A seventh invention relates to an electric power system provided with a battery containing a positive electrode, a negative electrode, and an electrolyte, in which the positive electrode contains a first active material and a second active material, the first active material and the second active material each contain a lithium composite oxide containing at least manganese (Mn), nickel (Ni), and cobalt (Co) as transition metals, the first active material has a particulate shape, an average porosity V1 in a particle of the first active material satisfies 10[%]≤V1≤30[%], an average particle diameter D1 of the first active material satisfies 6 [μm]≤D1≤20 [μm], the second active material has a particulate shape, an average porosity V2 in a particle of the second active material satisfies 0[%]≤V2≤10[%], an average particle diameter D2 of the second active material satisfies 1 [μm]≤D2≤6 [μm], and the electric power system receives electric power from the battery, or electric power is supplied from a power generating device or an electric power network to the battery.

Effects of the Invention

As described above, the present technology can achieve both a volume energy density and a load characteristic.

MODE FOR CARRYING OUT THE INVENTION

The present inventors made intensive studies in order to provide a lithium-excess positive electrode capable of achieving both a volume energy density and a load characteristic. Hereinafter, an outline thereof will be described.

By using a lithium-excess positive electrode active material as a positive electrode active material, increase in a capacity of a positive electrode can be expected. However, a diffusion resistance in a bulk of lithium (Li) in the lithium-excess positive electrode active material is much higher than that in another positive electrode active material. Therefore, in the lithium-excess positive electrode active material, when a positive electrode active material particle having a large particle diameter is manufactured, a load characteristic is deteriorated. On the other hand, when a lithium-excess positive electrode active material particle is manufactured such that a void is present in the particle under some coprecipitation conditions or firing conditions, the diffusion resistance in a bulk of lithium (Li) can be reduced and the load characteristic can be improved, but the void in the particle reduces a filling property (volume energy density). In addition, when a lithium-excess positive electrode active material particle having a small particle diameter is manufactured, the load characteristic can be improved similarly to the above case. However, only with such a positive electrode active material having a small particle diameter, improvement of the filling property (volume energy density) cannot be expected, and in addition, a slurry property is easily deteriorated.

Therefore, the present inventors made intensive studies in view of the above points. As a result, the present inventors have found that both a volume energy density and a load characteristic can be achieved by using a small particle having a low diffusion resistance in a particle of lithium (Li) and a large particle having a reduced diffusion resistance in a bulk of lithium (Li) by providing a void in the particle in combination thereof even when there is no void or there are a few voids in a particle. In addition, the present inventors have found that a particularly excellent volume energy density and load characteristic can be obtained when a mixing ratio of the two particles is set within a predetermined range.

Embodiments of the present technology will be described in the following order.

1. First embodiment (example of cylinder type battery)
2. Second embodiment (example of flat type battery)
3. Third embodiment (examples of battery pack and electronic device)
4. Fourth embodiment (example of electricity storage system)
5. Fifth embodiment (example of electric vehicle)

1. First Embodiment

[Structure of Battery]

Figure 1:
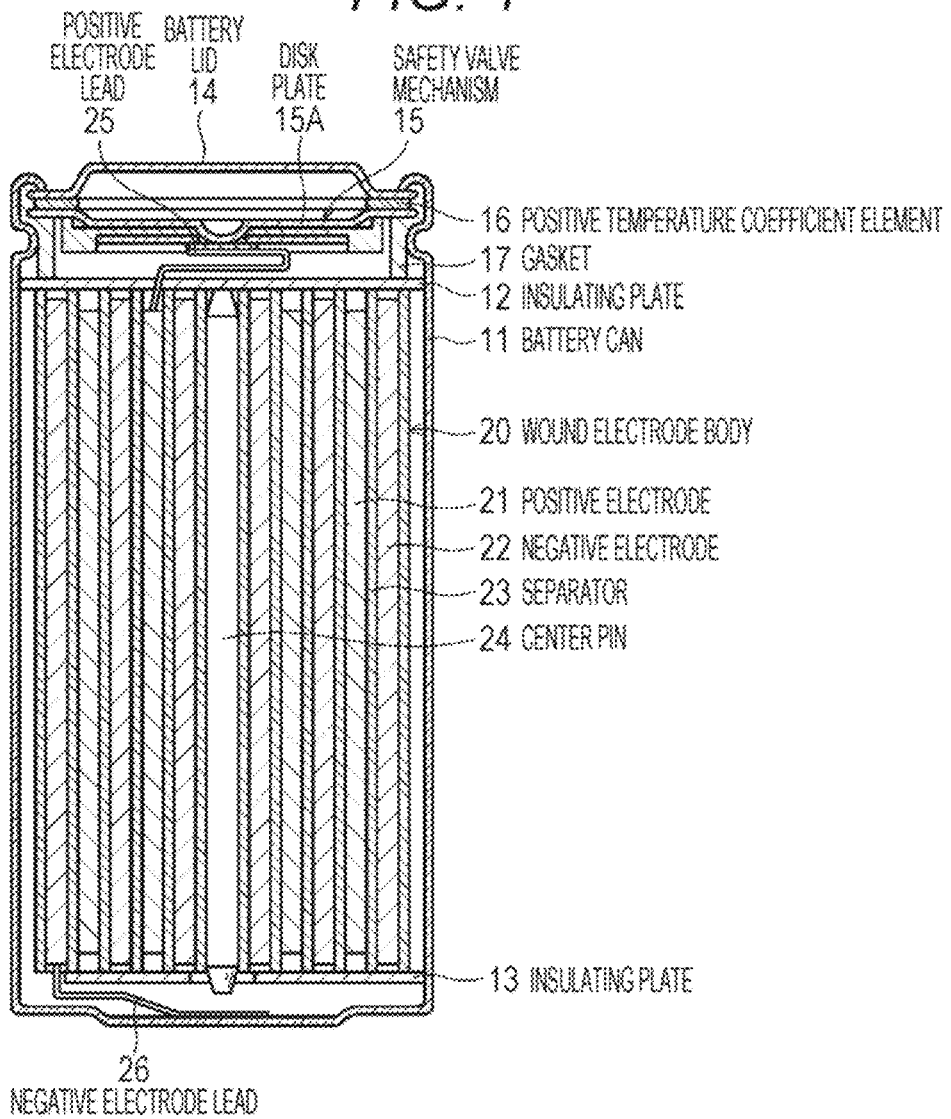
FIG. 1 is a cross-sectional view illustrating one structural example of a non-aqueous electrolyte secondary battery according to a first embodiment of the present technology.

Hereinafter, one structural example of a non-aqueous electrolyte secondary battery according to a first embodiment of the present technology will be described with reference to FIG. 1. For example, this non-aqueous electrolyte secondary battery is a lithium-ion secondary battery in which a capacity of a negative electrode is expressed by a capacity component due to occlusion of lithium (Li) which is an electrode reactant and release thereof. This non-aqueous electrolyte secondary battery is a so-called cylinder type battery, and includes a wound electrode body 20 obtained by stacking a pair of strip-shaped positive electrode 21 and strip-shaped negative electrode 22 through a separator 23 and winding the resulting stacked body in an approximately hollow cylinder-shaped battery can 11. The battery can 11 is formed of nickel (Ni)-plated iron (Fe), and a first end thereof is closed and a second end thereof is open. An electrolytic solution as an electrolyte is injected into the battery can 11, and the positive electrode 21, the negative electrode 22, and the separator 23 are impregnated therewith. In addition, a pair of insulating plates 12 and 13 is disposed perpendicularly to a winding peripheral surface so as to sandwich the wound electrode body 20.

A battery lid 14, a safety valve mechanism 15 disposed inside the battery lid 14, and a positive temperature coefficient element (PTC element) 16 are attached to the open end of the battery can 11 by being crimped through a sealing gasket 17. This seals an inside of the battery can 11. For example, the battery lid 14 is formed of a material similar to the battery can 11. The safety valve mechanism 15 is electrically connected to the battery lid 14. When an internal pressure of a battery becomes a certain level or more by internal short circuit, heating from an outside, or the like, a disk plate 15A is reversed to cut an electrical connection between the battery lid 14 and the wound electrode body 20. For example, the sealing gasket 17 is formed of an insulating material, and a surface thereof is coated with asphalt.

For example, a center pin 24 is inserted into the center of the wound electrode body 20. A positive electrode lead 25 formed of aluminum (Al) or the like is connected to the positive electrode 21 of the wound electrode body 20. A negative electrode lead 26 formed of nickel or the like is connected to the negative electrode 22. The positive electrode lead 25 is electrically connected to the battery lid 14 by being welded to the safety valve mechanism 15. The negative electrode lead 26 is welded to the battery can 11 to be electrically connected thereto.

In the non-aqueous electrolyte secondary battery according to the first embodiment, an open-circuit voltage in a full charge state per a pair of the positive electrode 21 and the negative electrode 22 (that is, battery voltage) may be 4.2 V or less, but may be designed so as to be higher than 4.2 V, preferably 4.4 V or more and 6.0 V or less, and more preferably 4.4 V or more and 5.0 V or less. By a higher battery voltage, a higher energy density can be obtained.

Figure 2:
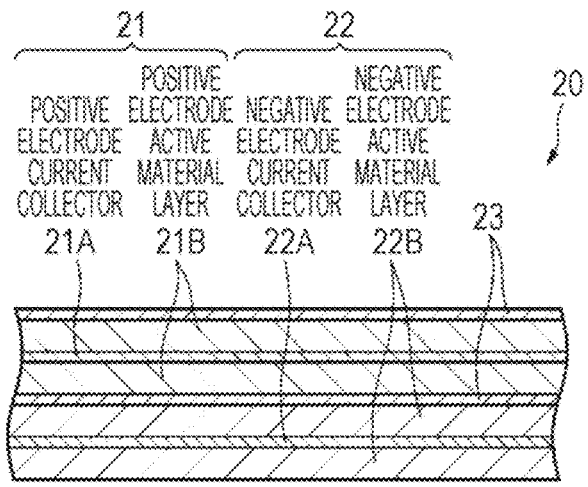
FIG. 2 is an enlarged cross-sectional view of a part of a wound electrode body illustrated in FIG. 1.

Hereinafter, the positive electrode 21, the negative electrode 22, the separator 23, and the electrolytic solution constituting the non-aqueous electrolyte secondary battery will be sequentially described with reference to FIG. 2.

(Positive Electrode)

The positive electrode 21 is a lithium-excess positive electrode, and for example, has a structure in which a positive electrode active material layer 21B is disposed on each of both surfaces of a positive electrode current collector 21A. Note that the positive electrode active material layer 21B may be disposed only on one surface of the positive electrode current collector 21A although not illustrated. For example, the positive electrode current collector 21A is formed of a metal foil such as an aluminum foil, a nickel foil, or a stainless steel foil. For example, the positive electrode active material layer 21B contains a lithium-excess positive electrode active material capable of occluding and releasing lithium (Li) which is an electrode reactant. The positive electrode active material layer 21B may further contain an additive, if necessary. As the additive, for example, at least one of a conductive agent and a binder can be used.

(Positive Electrode Active Material)

The positive electrode active material contains a first positive electrode active material and a second positive electrode active material. The first positive electrode active material and the second positive electrode active material each contain a lithium composite oxide containing at least manganese (Mn), nickel (Ni), and cobalt (Co) as transition metals. Specifically, the first positive electrode active material and the second positive electrode active material each contain a lithium composite oxide containing at least manganese (Mn), nickel (Ni), and cobalt (Co) in a state of a solid solution as transition metals.

An average composition of the lithium composite oxide is preferably represented by the following formula (1).

$$Li_{1+a}(Mn_bCo_cNi_{1-b-c})_{1-a}M3_dO_{2-e} \tag{1}$$

(Provided that, in formula (1), M3 is at least one of aluminum (Al), magnesium (Mg), zirconium (Zr), titanium (Ti), barium (Ba), boron (B), silicon (Si), and iron (Fe), and preferably at least one of aluminum (Al), magnesium (Mg), and titanium (Ti), and $0<a<0.25$, $0.3 \le b<0.7$, $0 \le c<1-b$, $0 \le d \le 1$, and $0 \le e \le 1$ are satisfied.)

The first positive electrode active material has a particulate shape. That is, the first positive electrode active material is formed of powder of a particle containing the first positive electrode active material (hereinafter, referred to as "first positive electrode active material particle"). The first positive electrode active material particle has a void in the particle. An average porosity V1 in the first positive electrode active material particle satisfies 10[%]≤V1≤30[%], and an average particle diameter D1 thereof satisfies 6 [μm]≤D1≤20 [μm]. Here, the average porosity V1 in a particle and the average particle diameter D1 are determined using a cross-sectional photograph of the positive electrode active material layer 21B.

The second positive electrode active material has a particulate shape. That is, the second positive electrode active material is formed of powder of a particle containing the second positive electrode active material (hereinafter, referred to as "second positive electrode active material particle"). The second positive electrode active material particle has no void in the particle, or has a void in the particle. An average porosity V2 in the second positive electrode active material particle satisfies 0[%]≤V2≤10[%], and an average particle diameter D2 thereof satisfies 1 [μm]≤D2≤6 [μm]. Here, the average porosity V2 in a particle and the average particle diameter D2 are determined using a cross-sectional photograph of the positive electrode active material layer 21B.

Both a volume energy density and a load characteristic can be achieved by using the first positive electrode active material and the second positive electrode active material satisfying the above relationship in combination thereof.

Specifically, V1 satisfying V1<10[%] increases a diffusion resistance of lithium (Li) in the first positive electrode active material particle, and reduces a load characteristic. On the other hand, V1 satisfying 30[%]<V1 reduces a filling property of the first positive electrode active material, and reduces a volume energy density. D1 satisfying D1<6 [μm] reduces the filling property of the first positive electrode active material, and reduces the volume energy density. On the other hand, D1 satisfying 20<D1 [μm] increases the diffusion resistance of lithium (Li) in the first positive electrode active material particle, and reduces the load characteristic.

V2 satisfying 10[%]<V2 reduces a filling property of the second positive electrode active material, and reduces a volume energy density. D2 satisfying D2<1 [μm] reduces the filling property of the second positive electrode active material, and reduces the volume energy density. On the other hand, D2 satisfying 6<D2 [μm] increases a diffusion resistance of lithium (Li) in the second positive electrode active material particle, and reduces a load characteristic.

A weight ratio between the first positive electrode active material and the second positive electrode active material (first positive electrode active material:second positive electrode active material) is preferably 95:5 or more and 70:30 or less. By setting the weight ratio within this range, a particularly excellent volume energy density and load characteristic can be obtained.

As described above, the first positive electrode active material particle has a void in the particle. This void is preferably distributed throughout an inside of the first positive electrode active material particle. As a void having such a distribution, a void three-dimensionally distributed so as to surround the center of the first positive electrode active material particle or an approximate center thereof, specifically a void having an annual ring shape is preferable.

When a void has a shape such as an annual ring shape and is distributed throughout an inside of the first positive electrode active material particle, occurrence of unevenness of a potential distribution in the first positive electrode active material particle can be further suppressed, and capacity degradation can be further prevented than a case where a void is locally present in the center of the first positive electrode active material particle or the like. In addition, disintegration of the first positive electrode active material particle due to expansion and contraction caused by charging and discharging can be suppressed, and charging and discharging can be performed more stably. Therefore, a cycle characteristic (capacity retention ratio) can be improved.

For example, the void having an annual ring shape is formed of a plurality of void layers three-dimensionally disposed so as to surround the center of a particle or an approximate center thereof and having different sizes (diameters). Each of the void layers constituting the annual ring may be formed of one continuous space or may be formed by distribution of many uncontinuous voids. Specific examples of the annual ring shape include a substantially concentric spherical shape, a substantially concentric elliptically spherical shape, and an amorphous shape, but the annual ring shape is not limited thereto.

When the first positive electrode active material particle is cut in an arbitrary direction so as to pass through an approximate center thereof, a void in a cross-section thereof preferably forms a plurality of annular void layers having different sizes (diameters) so as to surround the center of the first positive electrode active material particle or an approximate center thereof. Examples of a shape of the annular void layer include a substantially circular shape, a substantially elliptical shape, and an amorphous shape, but the shape of the annular void layer is not limited thereto.

As described above, the second positive electrode active material particle may have a void in the particle. This void is not particularly limited, but is preferably distributed throughout an inside of the second positive electrode active material particle from a viewpoint of suppressing a diffusion resistance in a particle of lithium (Li).

A weight ratio between the first positive electrode active material and the second positive electrode active material (first positive electrode active material:second positive electrode active material) is preferably 95:5 or more and 70:30 or less. By setting the weight ratio within this range, a particularly excellent volume energy density and load characteristic can be obtained.

(Binder)

As a binder, for example, at least one selected from resin materials such as polyvinylidene fluoride (PVdF), polytetrafluoroethylene (PTFE), polyacrylonitrile (PAN), styrene-butadiene rubber (SBR), and carboxymethyl cellulose (CMC), a copolymer mainly containing these resin materials, and the like is used.

(Conductive Agent)

Examples of the conductive agent include a carbon material such as graphite, carbon black, or Ketjen black. These materials can be used singly or in mixture of two or more kinds thereof. Further, in addition to the carbon material, a metal material, a conductive polymer material, or the like may be used as long as the material has conductivity.

(Negative Electrode)

For example, the negative electrode 22 has a structure in which a negative electrode active material layer 22B is disposed on each of both surfaces of a negative electrode current collector 22A. Note that the negative electrode active material layer 22B may be disposed only on one surface of the negative electrode current collector 22A although not illustrated. For example, the negative electrode current collector 22A is formed of a metal foil such as a copper foil, a nickel foil, or a stainless steel foil.

The negative electrode active material layer 22B contains one or more kinds of negative electrode materials capable of occluding and releasing lithium as a negative electrode active material. The negative electrode active material layer 22B may further contain an additive such as a binder, if necessary.

Note that, in the non-aqueous electrolyte secondary battery according to the first embodiment, an electrochemical equivalent of a negative electrode material capable of occluding and releasing lithium is larger than that of the positive electrode 21, and a lithium metal is not precipitated on the negative electrode 22 during charging.

Examples of the negative electrode material capable of occluding and releasing lithium include a material capable of occluding and releasing lithium and containing at least one of metal elements and metalloid elements as a constituent element. Here, the negative electrode 22 containing such a negative electrode material is referred to as an alloy-based negative electrode. This is because a high energy density can be obtained by use of such a material. Particularly, use of such a material together with a carbon material is more preferable because a high energy density and an excellent cycle characteristic can be obtained simultaneously. This negative electrode material may be a simple substance of a metal element or a metalloid element, an alloy thereof, or a compound thereof, and may partially contain one or more kinds of phases thereof. Incidentally, in the present technology, the alloy includes an alloy formed of one or more kinds of metal elements and one or more kinds of metalloid elements in addition to an alloy formed of two or more kinds of metal elements. In addition, the negative electrode material may contain a nonmetallic element. A structure thereof includes a solid solution, a eutectic (eutectic mixture), an intermetallic compound, and coexistence of two or more kinds thereof.

Examples of the metal element or the metalloid element constituting the negative electrode material include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These elements may be crystalline or amorphous.

Among these elements, as this negative electrode material, an element containing a metal element or a metalloid element of Group 4B in the short period periodic table as a constituent element is preferable, and an element containing at least one of (Si) and tin (Sn) as a constituent element is particularly preferable. This is because silicon (Si) and tin (Sn) have a high ability to occlude and release lithium (Li), and a high energy density can be obtained.

Examples of an alloy of tin (Sn) include an alloy containing at least one of the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a second constituent element other than tin (Sn). Examples of an alloy of silicon (Si) include an alloy containing at least one of the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a second constituent element other than silicon (Si).

Examples of a compound of tin (Sn) or a compound of silicon (Si) include a compound containing oxygen (O) or carbon (C). The compound of tin (Sn) or the compound of silicon (Si) may contain the above second constituent element in addition to tin (Sn) or silicon (Si). Specific examples of the compound of tin (Sn) include a silicon oxide represented by $SiO_v$ ($0.2<v<1.4$).

Examples of the negative electrode material capable of occluding and releasing lithium include a carbon material such as hardly graphitizable carbon, easily graphitizable carbon, graphite, pyrolytic carbon, coke, glassy carbon, an organic polymer compound fired body, carbon fiber, or activated carbon. Preferable examples of the graphite include natural graphite subjected to a spheroidization treatment or the like, and substantially spherical artificial graphite. Preferable examples of the artificial graphite include artificial graphite obtained by graphitizing mesocarbon microbeads (MCMB) and artificial graphite obtained by graphitizing and grinding coke raw materials. Examples of the coke include pitch coke, needle coke, and petroleum coke. The organic polymer compound fired body is obtained by firing a polymer material such as a phenol resin or a furan resin at an appropriate temperature to be carbonized. Some organic polymer compound fired bodies are classified into hardly graphitizable carbon or easily graphitizable carbon. In addition, examples of the polymer material include polyacetylene and polypyrrole. These carbon materials are preferable because a change in a crystal structure occurring during charging and discharging is very small, a high charge-discharge capacity can be obtained, and an excellent cycle characteristic can be obtained. Particularly, graphite is preferable because a high energy density can be obtained due to a large electrochemical equivalent thereof. In addition, the hardly graphitizable carbon is preferable because an excellent characteristic can be obtained. Furthermore, a material having a low charge-discharge potential, specifically having a charge-discharge potential close to a lithium metal is preferable because a high energy density of a battery can be realized easily.

Other examples of the negative electrode material capable of occluding and releasing lithium include other metal compounds and a polymer material. Examples of the other metal compounds include an oxide such as $MnO_2$, $V_2O_5$, or $V_6O_{13}$, a sulfide such as NiS or MoS, and a lithium nitride such as $LiN_3$. Examples of the polymer material include polyacetylene, polyaniline, and polypyrrole.

In general, a carbon material is used for a negative electrode active material of a lithium-ion secondary battery. Due to recent multifunctionality of electronic devices, consumption electric power thereof has been increased significantly, and a secondary battery having a large capacity has become necessary increasingly. However, as long as a carbon material is used, it will become difficult to meet the needs in the near future. Therefore, a negative electrode active material formed of a Sn-based material or a Si-based material having a higher capacity than a carbon material has been developed actively. However, the negative electrode active material formed of a Sn-based material or a Si-based material generally has a large irreversible capacity at the time of initial charging. Therefore, in order to utilize a high capacity characteristic of these negative electrode active materials, these negative electrode active materials are preferably used in combination with a positive electrode active material having a high capacity and a proper irreversible capacity. As such a positive electrode active material, a positive electrode active material containing the first positive electrode active material and the second positive electrode active material is preferable. That is, use of a negative electrode active material containing at least one of silicon (Si) and tin (Sn) and a positive electrode active material containing the first positive electrode active material and the second positive electrode active material in combination thereof is preferable.

(Binder)

As the binder, for example, at least one selected from resin materials such as polyvinylidene fluoride (PVdF), polytetrafluoroethylene (PTFE), polyacrylonitrile (PAN), styrene-butadiene rubber (SBR), and carboxymethyl cellulose (CMC), a copolymer mainly containing these resin materials, and the like is used.

(Separator)

The separator 23 isolates the positive electrode 21 and the negative electrode 22 from each other to prevent short circuit of a current due to contact between both the electrodes, and allows a lithium ion to pass therethrough. For example, the separator 23 is formed of a synthetic resin porous film formed of polytetrafluoroethylene, polypropylene, polyethylene, or the like, or a ceramic porous film, and may have a structure obtained by stacking two or more kinds of these porous films. Among these films, a polyolefin porous film is preferable because the polyolefin porous film exhibits an excellent effect for preventing short circuit, and can improve safety of a battery due to a shutdown effect. Particularly, polyethylene is preferable as a material constituting the separator 23 because polyethylene can obtain a shutdown effect within a range of 100° C. or higher and 160° C. or lower and has excellent electrochemical stability. In addition, polypropylene is preferable. Furthermore, a resin having chemical stability can be used by copolymerizing the resin with polyethylene or polypropylene or blending the resin with polyethylene or polypropylene.

(Electrolytic Solution)

The separator 23 is impregnated with an electrolytic solution which is a liquid electrolyte. The electrolytic solution contains a solvent and an electrolyte salt dissolved in this solvent. The electrolytic solution may contain a known additive in order to improve a battery characteristic.

As the solvent, a cyclic carbonate such as ethylene carbonate or propylene carbonate can be used. It is preferable to use one of ethylene carbonate and propylene carbonate, and particularly preferable to mix and use both thereof. This is because a cycle characteristic can be improved.

In addition, as the solvent, it is preferable to mix and use chain carbonates such as diethyl carbonate, dimethyl carbonate, ethylmethyl carbonate, and methyl propyl carbonate in addition to these cyclic carbonates. This is because a high ionic conductivity can be obtained.

The solvent preferably further contains 2,4-difluoro anisole or vinylene carbonate. This is because 2,4-difluoro anisole can improve a discharge capacity, and vinylene carbonate can improve a cycle characteristic. Therefore, use of these compounds in mixture thereof is preferable because the discharge capacity and the cycle characteristic can be improved.

In addition to these compounds, examples of the solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3 dioxolane, methyl acetate, methyl propionate, acetonitrile, glutaronitrile, adiponitrile, methoxy acetonitrile, 3-methoxy propylonitrile, N,N-dimethylformamide, N-methylpyrrolidinone, N-methyl-oxazolidinone, N,N-dimethyl imidazolidinone, nitromethane, nitroethane, sulfolane, dimethyl sulfoxide, and trimethyl phosphate.

Incidentally, a compound obtained by replacing at least a part of hydrogen atoms in these non-aqueous solvents with a fluorine atom may be preferable because the compound may improve reversibility of an electrode reaction with some types of combined electrodes.

Examples of the electrolyte salt include a lithium salt. The lithium salt can be used singly or in mixture of two or more kinds thereof. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, difluoro [oxalate-O,O'] lithium borate, lithium bis-oxalate borate, and LiBr. Among these lithium salts, $LiPF_6$ is preferable because $LiPF_6$ can obtain a high ionic conductivity and can improve a cycle characteristic.

In the non-aqueous electrolyte secondary battery having the above structure, when charging is performed, for example, a lithium ion is released from the positive electrode active material layer 21B, and is occluded by the negative electrode active material layer 22B through an electrolytic solution. In addition, when discharging is performed, for example, a lithium ion is released from the negative electrode active material layer 22B, and is occluded by the positive electrode active material layer 21B through an electrolytic solution.

[Method for Manufacturing Battery]

Next, a method for manufacturing the non-aqueous electrolyte secondary battery according to the first embodiment of the present technology will be exemplified.

First, for example, a first positive electrode active material, a second positive electrode active material, a conductive agent, and a binder are mixed to prepare a positive electrode mixture, and this positive electrode mixture is dispersed in a solvent such as N-methyl-2-pyrrolidone (NMP) to manufacture a paste-like positive electrode mixture slurry. Subsequently, this positive electrode mixture slurry is applied to the positive electrode current collector 21A, the solvent is dried, and the resulting product is subjected to compression molding with a roll press machine or the like to form the positive electrode active material layer 21B and form the positive electrode 21.

In addition, for example, a negative electrode active material and a binder are mixed to prepare a negative electrode mixture, and this negative electrode mixture is dispersed in a solvent such as N-methyl-2-pyrrolidone to manufacture a paste-like negative electrode mixture slurry. Subsequently, this negative electrode mixture slurry is applied to the negative electrode current collector 22A, the solvent is dried, and the resulting product is subjected to compression molding with a roll press machine or the like to form the negative electrode active material layer 22B and form the negative electrode 22.

Subsequently, the positive electrode lead 25 is attached to the positive electrode current collector 21A by welding or the like, and the negative electrode lead 26 is attached to the negative electrode current collector 22A by welding or the like. Subsequently, the positive electrode 21 and the negative electrode 22 are wound through the separator 23. Subsequently, an end of the positive electrode lead 25 is welded to the safety valve mechanism 15, and an end of the negative electrode lead 26 is welded to the battery can 11. The wound positive electrode 21 and negative electrode 22 are sandwiched by the pair of insulating plates 12 and 13, and are housed in the battery can 11. Subsequently, the positive electrode 21 and the negative electrode 22 are housed in the battery can 11. Thereafter, the electrolytic solution is injected into the battery can 11, and the separator 23 is impregnated therewith. Subsequently, the battery lid 14, the safety valve mechanism 15, and the positive temperature coefficient element 16 are fixed to an open end of the battery can 11 by being crimped through the sealing gasket 17. The secondary battery illustrated in FIG. 1 is thereby obtained.

[Effect]

According to the first embodiment, both a volume energy density of the lithium-excess positive electrode 21 and a load characteristic thereof can be achieved by using the following first positive electrode active material and second positive electrode active material in combination thereof.

First positive electrode active material: a positive electrode active material having an average porosity V1 in a particle satisfying 10[%]≤V1≤30[%] and an average particle diameter D1 satisfying 6 [μm]≤D1≤20 [μm].

Second positive electrode active material: a positive electrode active material having an average porosity V2 in a particle satisfying 0[%]≤V2≤10[%] and an average particle diameter D2 satisfying 1 [μm]≤D2≤6 [μm].

When a weight ratio between the first positive electrode active material and the second positive electrode active material (first positive electrode active material:second positive electrode active material) is 95:5 or more and 70:30 or less, a particularly excellent volume energy density and load characteristic can be obtained.

2. Second Embodiment

[Structure of Battery]

Figure 3:
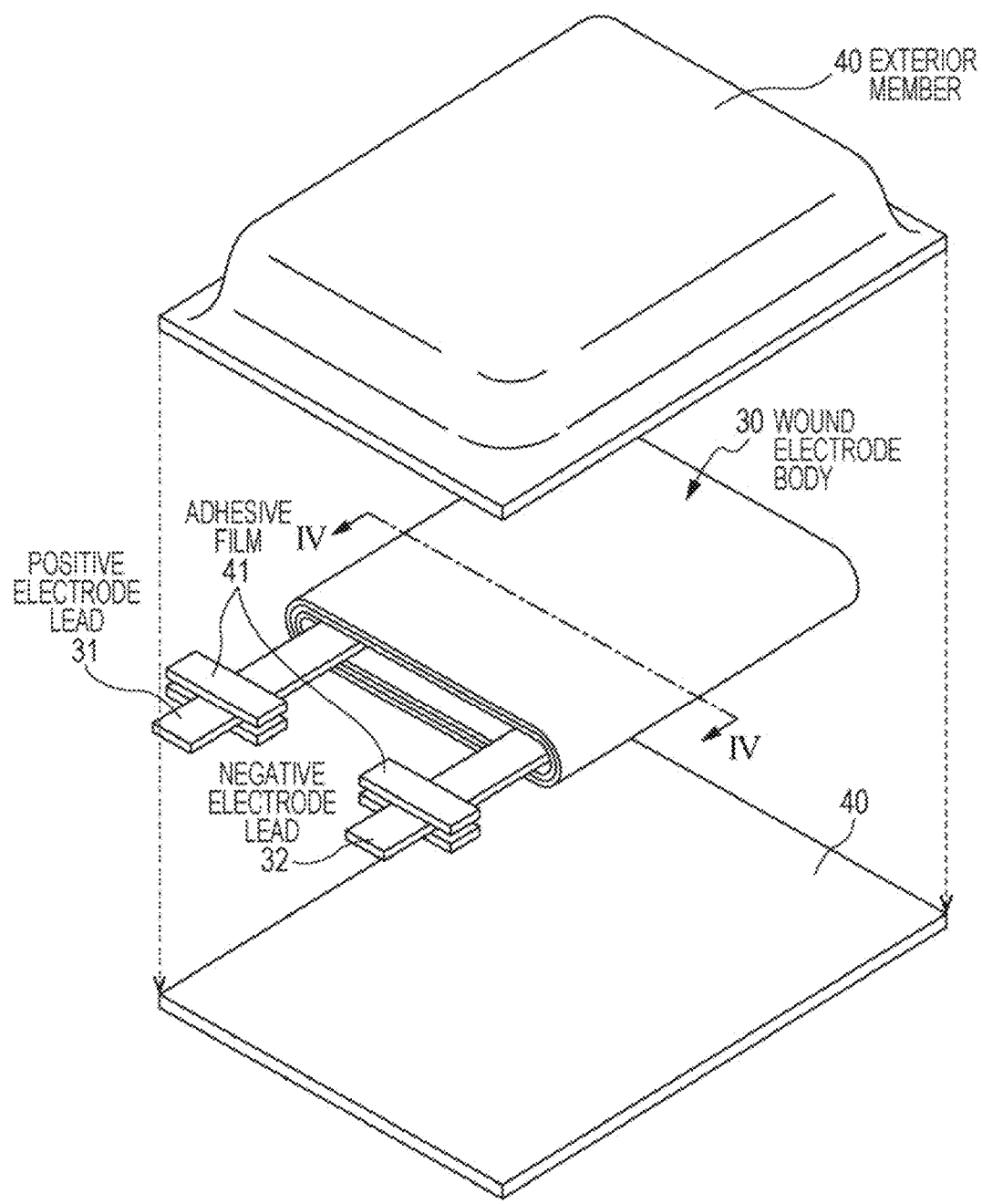
FIG. 3 is an exploded perspective view illustrating one structural example of a non-aqueous electrolyte secondary battery according to a second embodiment of the present technology.

FIG. 3 is an exploded perspective view illustrating one structural example of a non-aqueous electrolyte secondary battery according to a second embodiment of the present technology. This secondary battery is obtained by housing a flat wound electrode body 30 to which a positive electrode lead 31 and a negative electrode lead 32 have been attached in a film-like exterior member 40, and can be smaller, lighter, and thinner.

Each of the positive electrode lead 31 and the negative electrode lead 32 goes from an inside of the exterior member 40 to an outside thereof, and for example, is led out in the same direction. For example, each of the positive electrode lead 31 and the negative electrode lead 32 is formed of a metal material such as aluminum, copper, nickel, or stainless steel, and has a thin plate shape or a mesh shape.

For example, the exterior member 40 is formed of a rectangular aluminum laminate film obtained by bonding a nylon film, an aluminum foil, and a polyethylene film in this order. For example, the exterior member 40 is disposed such that a side of the polyethylene film faces the wound electrode body 30, and outer peripheral portions thereof are in close contact with each other by fusion or an adhesive. An adhesive film 41 is inserted between the exterior member 40 and each of the positive electrode lead 31 and the negative electrode lead 32 in order to prevent entrance of the outside air. The adhesive film 41 is formed of a material having adhesion to the positive electrode lead 31 and the negative electrode lead 32, for example, of a polyolefin resin such as polyethylene, polypropylene, modified polyethylene, or modified polypropylene.

Note that the exterior member 40 may be formed of a laminate film having another structure, a polymer film such as polypropylene, or a metal film in place of the above aluminum laminate film.

Figure 4:
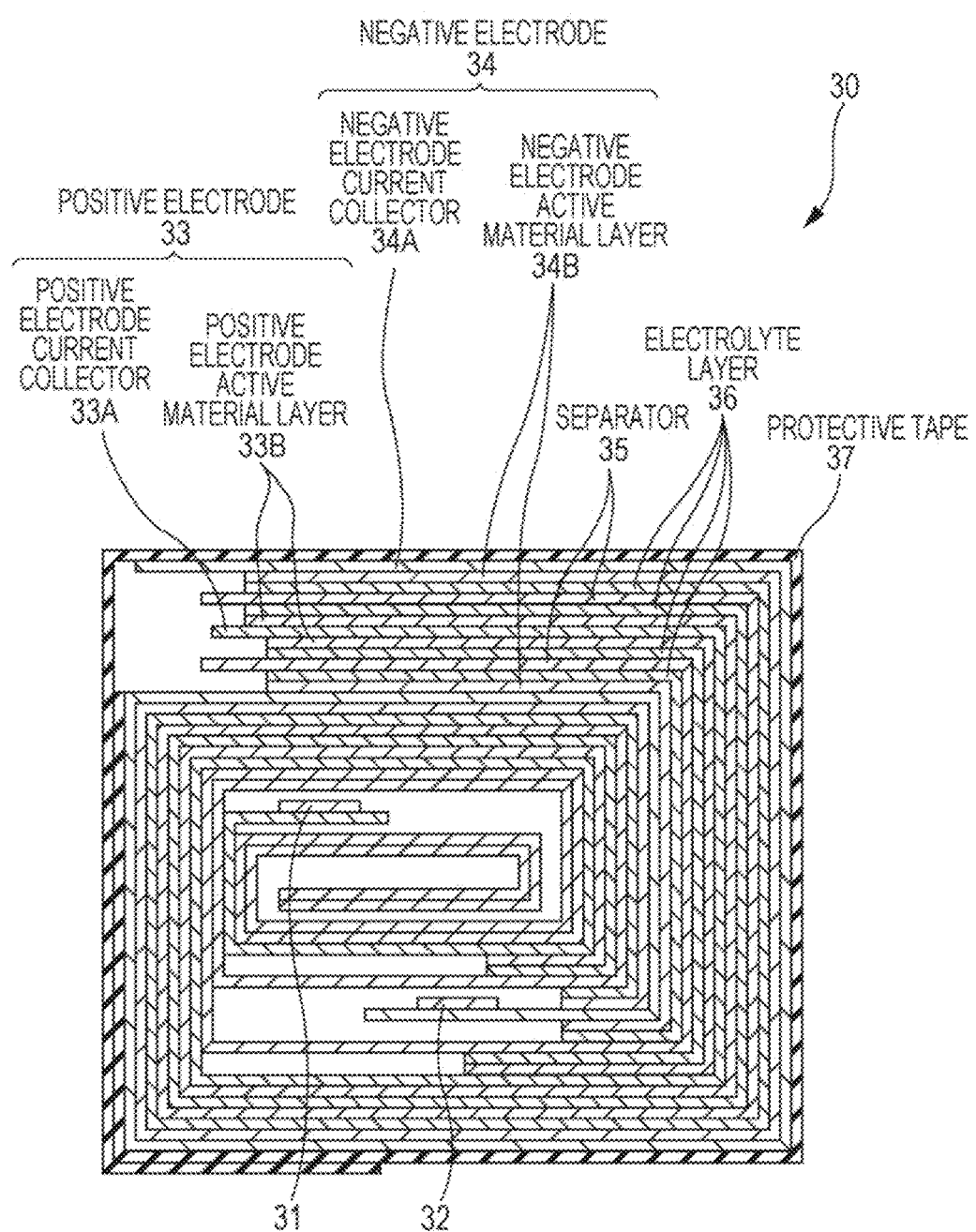
FIG. 4 is a cross-sectional view of a wound electrode body cut along line IV-IV in FIG. 3.

FIG. 4 is an enlarged cross sectional view of apart of the wound electrode body illustrated in FIG. 3. The wound electrode body 30 is obtained by stacking a positive electrode 21 and a negative electrode 22 through a separator 23 and an electrolyte layer 33 and winding the resulting stacked body, and an outermost peripheral portion thereof may be protected with a protective tape (not illustrated). The electrolyte layer 33 is disposed between the positive electrode 21 and the separator 23 and between the negative electrode 22 and the separator 23. In the second embodiment, the same signs are given to portions similar to the first embodiment, and description thereof will be omitted.

The electrolyte layer 33 contains an electrolytic solution and a polymer compound serving as a holding body for holding the electrolytic solution, and is in a so-called gel state. The gel electrolyte layer 33 is preferable because the electrolyte layer 33 can obtain a high ionic conductivity and can prevent leakage of a battery. A composition of the electrolytic solution is similar to that of the non-aqueous electrolyte secondary battery according to the first embodiment. Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate. Polyacrylonitrile, polyvinylidene fluoride, polyhexafluoropropylene, or polyethylene oxide is particularly preferable in terms of electrochemical stability.

[Method for Manufacturing Battery]

Next, a method for manufacturing the non-aqueous electrolyte secondary battery according to the second embodiment of the present technology will be exemplified. First, a precursor solution containing a solvent, an electrolyte salt, a polymer compound, and a mixed solvent is applied to each of the positive electrode 21 and the negative electrode 22, and the mixed solvent is volatilized to form the electrolyte layer 33. Subsequently, the positive electrode lead 31 is attached to an end of the positive electrode current collector 21A by welding, and the negative electrode lead 32 is attached to an end of the negative electrode 22 by welding. Subsequently, the positive electrode 21 and the negative electrode 22 are stacked through the separator 23 to obtain a stacked body. Thereafter, this stacked body is wound in a longitudinal direction thereof, and a protective tape is bonded to an outermost peripheral portion thereof to form the wound electrode body 30. Finally, for example, the wound electrode body 30 is inserted into the exterior member 40, and outer peripheral portions of the exterior member 40 are in close contact with each other by thermal fusion or the like to be sealed. At this time, the adhesive film 41 is inserted between the exterior member 40 and each of the positive electrode lead 31 and the negative electrode lead 32. The non-aqueous electrolyte secondary battery illustrated in FIG. 3 is thereby obtained.

In addition, the non-aqueous electrolyte secondary battery according to the second embodiment of the present technology may be manufactured as follows. First, the positive electrode lead 31 and the negative electrode lead 32 are attached to the positive electrode 21 and the negative electrode 22, respectively. Subsequently, the positive electrode 21 and the negative electrode 22 are stacked through the separator 23, the resulting stacked body is wound, and a protective tape is bonded to an outermost peripheral portion thereof to form a wound body which is a precursor of the wound electrode body 30. Subsequently, this wound body is inserted into the exterior member 40, outer peripheral portions excluding one side are thermally fused to be formed into a bag shape, and the resulting product is housed in the exterior member 40. Subsequently, an electrolyte composition containing a solvent, an electrolyte salt, a monomer serving as a raw material of a polymer compound, a polymerization initiator, and another material such as a polymerization inhibitor, as necessary, is prepared.

Subsequently, the electrolyte composition is injected into the exterior member 40, and then an opening of the exterior member 40 is thermally fused under a vacuum atmosphere to be sealed. Subsequently, the monomer is polymerized by heating to obtain a polymer compound, and the gel electrolyte layer 33 is thereby formed. The non-aqueous electrolyte secondary battery illustrated in FIG. 3 is obtained in such a manner described above.

An action and an effect of the non-aqueous electrolyte secondary battery according to the second embodiment are similar to those of the non-aqueous electrolyte secondary battery according to the first embodiment.

3. Third Embodiment

In a third embodiment, a battery pack and an electronic device including the non-aqueous electrolyte secondary battery according to the first or second embodiment will be described.

Figure 5:
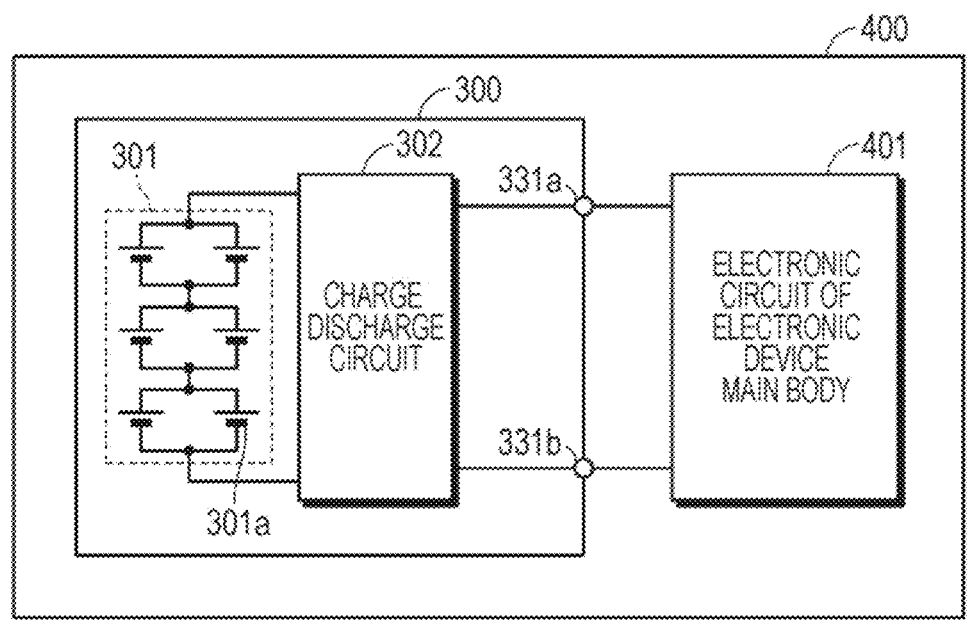
FIG. 5 is a block diagram illustrating one structural example of each of a battery pack and an electronic device according to a third embodiment of the present technology.

Hereinafter, structures of a battery pack 300 and an electronic device 400 according to the third embodiment of the present technology will be exemplified with reference to FIG. 5. The electronic device 400 includes an electronic circuit 401 of an electronic device main body and the battery pack 300. The battery pack 300 is electrically connected to the electronic circuit 401 through a positive electrode terminal 331a and a negative electrode terminal 331b. For example, in the electronic device 400, the battery pack 300 is attachable and removable by a user. Note that the structure of the electronic device 400 is not limited thereto, but the battery pack 300 may be incorporated in the electronic device 400 such that a user cannot remove the battery pack 300 from the electronic device 400.

During charging of the battery pack 300, the positive electrode terminal 331a of the battery pack 300 and the negative electrode terminal 331b thereof are connected to a positive electrode terminal of a charger (not illustrated) and a negative electrode terminal thereof, respectively. On the other hand, during discharging of the battery pack 300 (during use of the electronic device 400), the positive electrode terminal 331a of the battery pack 300 and the negative electrode terminal 331b thereof are connected to a positive electrode terminal of the electronic circuit 401 and a negative electrode terminal thereof, respectively.

Examples of the electronic device 400 include a notebook personal computer, a tablet computer, a mobile phone (for example, a smart phone), a personal digital assistant (PDA), an imaging device (for example, a digital still camera or a digital video camera), an audio device (for example, a portable audio player), a game device, a cordless handset phone machine, an electronic book, an electronic dictionary, a radio, a headphone, a navigation system, a memory card, a pacemaker, a hearing aid, an electric tool, an electric shaver, a refrigerator, an air conditioner, a television, a stereo, a water heater, a microwave oven, a dishwasher, a washing machine, a dryer, a lighting device, a toy, a medical device, a robot, a load conditioner, and a traffic signal. However, the electronic device 400 is not limited thereto.

(Electronic Device)

For example, the electronic circuit 401 includes CPU, a peripheral logic unit, an interface unit, and a storage unit, and controls the entire electronic device 400.

(Battery Pack)

The battery pack 300 includes an assembled battery 301 and a charge-discharge circuit 302. The assembled battery 301 is formed by connecting a plurality of secondary batteries 301a to each other in series or in parallel. For example, the plurality of secondary batteries 301a are connected to each other in n parallel m series (each of n and m is a positive integer). Note that FIG. 5 illustrates an example in which six secondary batteries 301a are connected to each other in 2 parallel 3 series (2P3S). As the secondary battery 301a, the non-aqueous electrolyte secondary battery according to the first or second embodiment is used.

During charging, the charge-discharge circuit 302 controls charging to the assembled battery 301. On the other hand, during discharging (that is, during use of the electronic device 400), the charge-discharge circuit 302 controls discharging to the electronic device 400.

4. Fourth Embodiment

In a fourth embodiment, an electricity storage system including the non-aqueous electrolyte secondary battery according to the first or second embodiment in the electricity storage device will be described. This electricity storage system may be any system as long as using electric power, and includes a simple electric power device. Examples of this electric power system include a smart grid, a home energy management system (HEMS), and a vehicle. The electric power system can also store electricity.

[Structure of Electricity Storage System]

Figure 6:
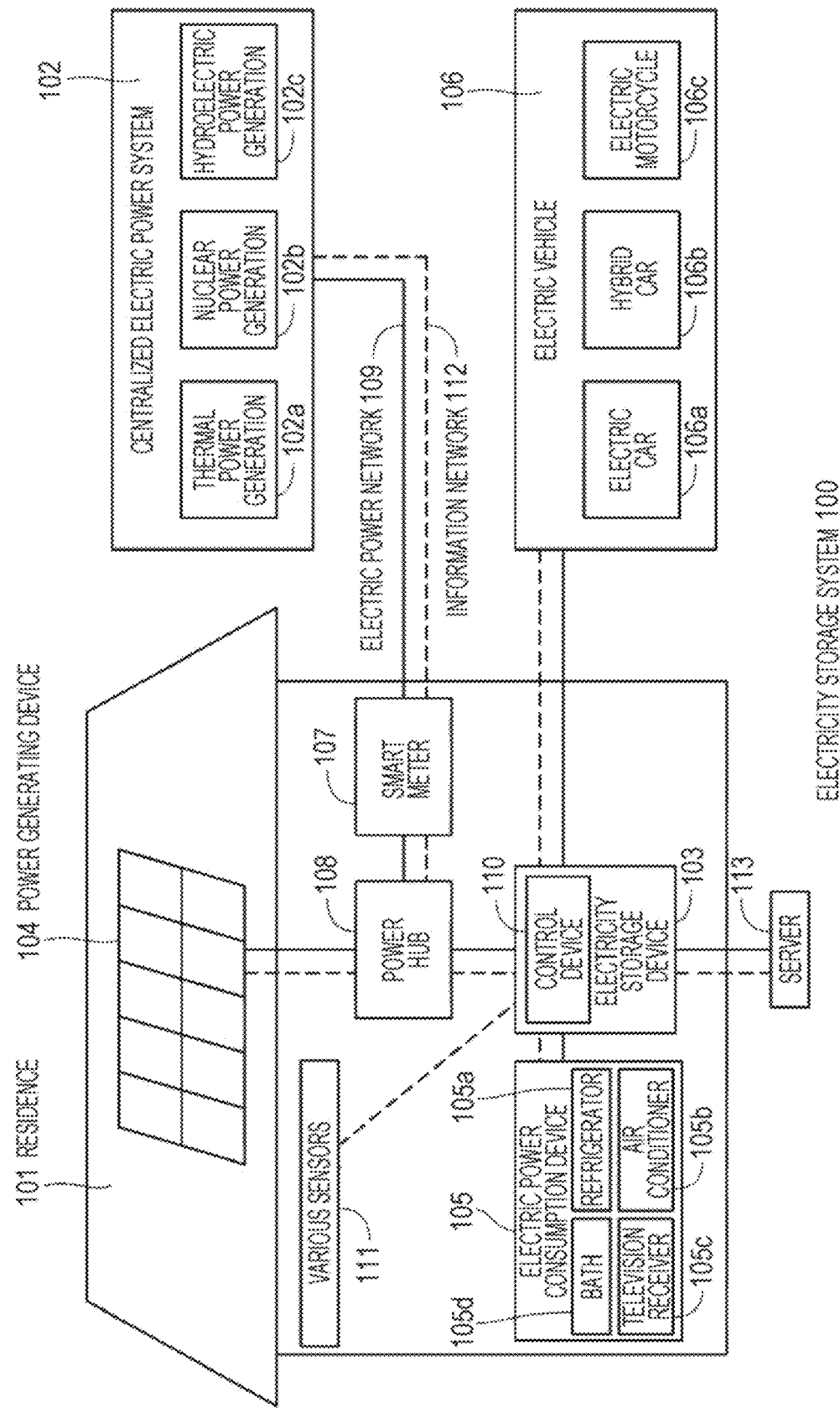
FIG. 6 is a schematic diagram illustrating one structural example of an electricity storage system according to a fourth embodiment of the present technology.

Hereinafter, a structure of an electricity storage system (electric power system) 100 according to the fourth embodiment will be exemplified with reference to FIG. 6. The electricity storage system 100 is a residential electricity storage system, and electric power is supplied from a centralized electric power system 102 such as thermal power generation 102a, nuclear power generation 102b, or hydroelectric power generation 102c to an electricity storage device 103 via an electric power network 109, an information network 112, a smart meter 107, a power hub 108, or the like. At the same time, electric power is supplied from an independent power source such as a home power generating device 104 to the electricity storage device 103. Electric power supplied to the electricity storage device 103 is stored. Electric power used in a residence 101 is supplied using the electricity storage device 103. Not only the residence 101 but also a building can use a similar electricity storage system.

The residence 101 is provided with the home power generating device 104, an electric power consumption device 105, the electricity storage device 103, a control device 110 for controlling devices, the smart meter 107, the power hub 108, and a sensor 111 for acquiring various information. The devices are connected to each other via the electric power network 109 and the information network 112. As the home power generating device 104, a solar cell, a fuel cell, or the like is used, and generated electric power is supplied to the electric power consumption device 105 and/or the electricity storage device 103. The electric power consumption device 105 is a refrigerator 105a, an air conditioner 105b, a television receiver 105c, a bath 105d, or the like. Furthermore, the electric power consumption device 105 further includes an electric vehicle 106. The electric vehicle 106 is an electric car 106a, a hybrid car 106b, or an electric motorcycle 106c.

The electricity storage device 103 includes the non-aqueous electrolyte secondary battery according to the first or second embodiment. The smart meter 107 measures a use amount of commercial electric power, and transmits the measured use amount to an electric power company. The electric power network 109 may be any one of DC power supply, AC power supply, and non-contact power supply, or a combination of two or more thereof.

Examples of the various sensors 111 include a human sensor, an illuminance sensor, an object detection sensor, a consumed electric power sensor, a vibration sensor, a contact sensor, a temperature sensor, and an infrared sensor. Information acquired by the various sensors 111 is transmitted to the control device 110. A weather condition, a human condition, or the like is understood due to the Information from the sensors 111, and energy consumption can be minimized by automatic control of the electric power consumption device 105. Furthermore, the control device 110 can transmit information on the residence 101 to an external electric power company or the like via internet.

The power hub 108 performs processing such as branching of an electric power line or DC-AC conversion. A communication method of the information network 112 connected to the control device 110 includes a method of using a communication interface such as universal asynchronous receiver-transceiver (UART) and a method of using a sensor network by a wireless communication standard, such as Bluetooth (registered trademark), ZigBee, or Wi-Fi. The Bluetooth (registered trademark) method is applied to multimedia communication and perform one-to-many communication. ZigBee uses a physical layer of IEEE (Institute of Electrical and Electronics Engineers) 802.15.4. IEEE802.15.4 is a name of a short-distance wireless network standard called personal area network (PAN) or wireless (W) PAN.

The control device 110 is connected to an external server 113. This server 113 may be managed by any one of the residence 101, an electric power company, and a service provider. For example, information transmitted or received by the server 113 is consumption electric power information, life pattern information, electric power charge, weather information, natural disaster information, or information about electric power transaction. A home electric power consumption device (for example, a television receiver) may transmit or receive the information, but an outside-home device (for example, a mobile phone) may transmit or receive the information. A device having a display function, such as a television receiver, a mobile phone, or a personal digital assistant (PDA), may display the information.

The control device 110 for controlling units is constituted by a central processing unit (CPU), a random access memory (RAM), a read only memory (ROM), and the like, and is housed in the electricity storage device 103 in this example. The control device 110 is connected to the electricity storage device 103, the home power generating device 104, the electric power consumption device 105, the various sensors 111, and the server 113 via the information network 112, and for example, adjusts a use amount of commercial electric power and a power generation amount. Note that the control device 110 may perform electric power transaction in an electric power market.

As described above, the electricity storage device 103 can store not only electric power from the centralized electric power system 102 such as the thermal power generation 102a, the nuclear power generation 102b, or the hydroelectric power generation 102c but also electric power generated by the home power generating device 104 (solar power generation or wind power generation). Therefore, even when the electric power generated by the home power generating device 104 fluctuates, control for keeping the amount of electric power to be sent to an outside constant or discharging by a necessary amount of electric power can be performed. For example, the following method of use is possible. That is, electric power obtained by solar power generation is stored in the electricity storage device 103, midnight electric power the charge of which is low at night is stored in the electricity storage device 103, and electric power stored in the electricity storage device 103 is used by discharging in daytime in which electric power charge is high.

Note that, in this example, the control device 110 housed in the electricity storage device 103 has been exemplified, but the control device 110 may be housed in the smart meter 107, or may be formed alone. Furthermore, the electricity storage system 100 may be used for a plurality of homes in a multiple dwelling house or a plurality of detached houses.

5. Fifth Embodiment

In a fifth embodiment, an electric vehicle including the non-aqueous electrolyte secondary battery according to the first or second embodiment will be described.

Figure 7:
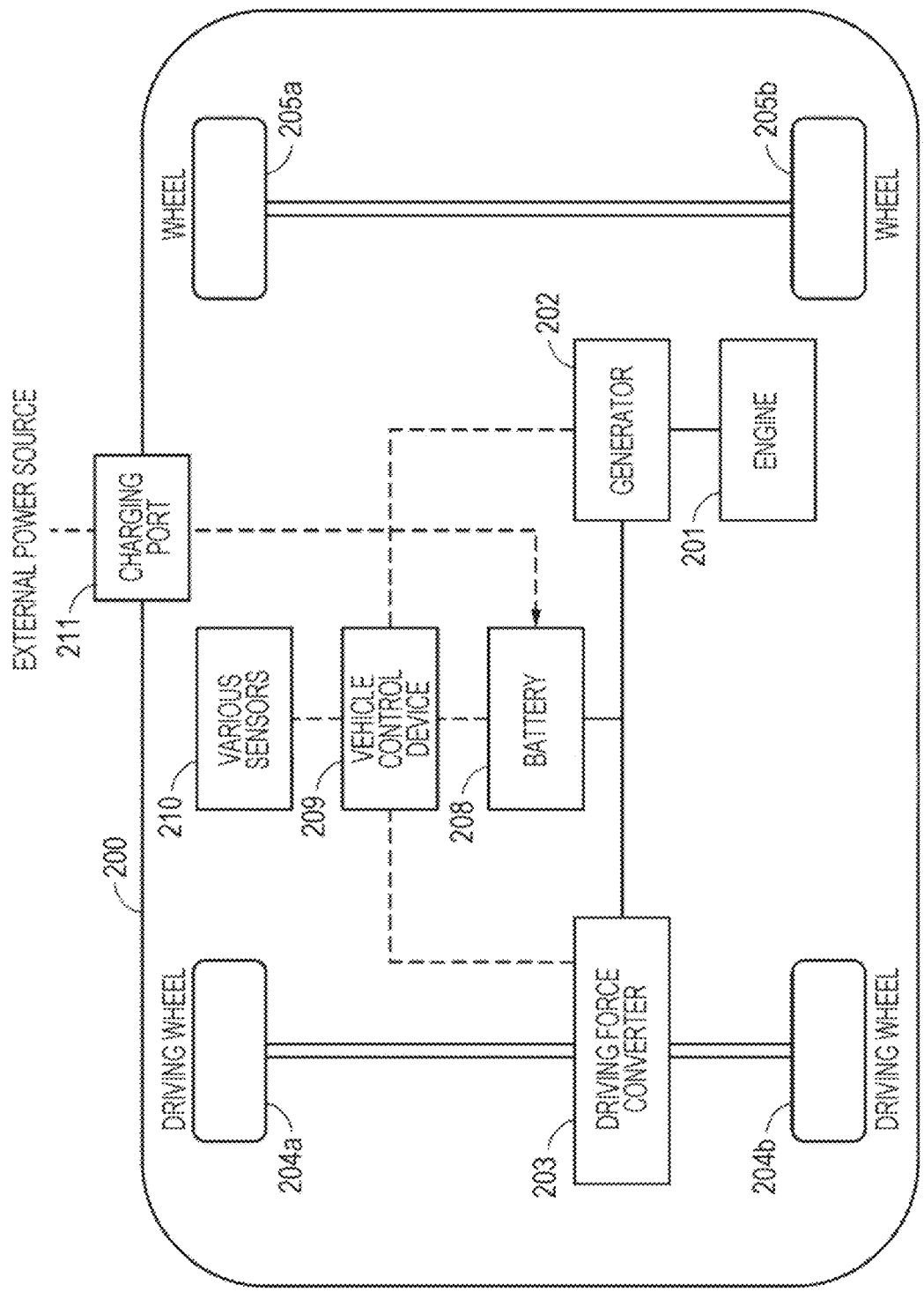
FIG. 7 is a schematic diagram illustrating one structural example of an electric vehicle according to a fifth embodiment of the present technology.

Hereinafter, one structure of the electric vehicle according to the fifth embodiment of the present technology will be exemplified with reference to FIG. 7. A hybrid vehicle 200 is a hybrid vehicle using a series hybrid system. The series hybrid system is a car travelling with an electric power driving force converter 203 using electric power generated by a generator driven by an engine or electric power obtained by temporarily storing the generated electric power in a battery.

An engine 201, a generator 202, the electric power driving force converter 203, a driving wheel 204a, a driving wheel 204b, a wheel 205a, a wheel 205b, a battery 208, a vehicle control device 209, various sensors 210, and a charging port 211 are mounted in this hybrid vehicle 200. As the battery 208, the non-aqueous electrolyte secondary battery according to the first or second embodiment is used.

The hybrid vehicle 200 travels using the electric power driving force converter 203 as a power source. An example of the electric power driving force converter 203 is a motor. The electric power driving force converter 203 acts by electric power of the battery 208, and a rotating force of the electric power driving force converter 203 is transmitted to the driving wheels 204a and 204b. Note that the electric power driving force converter 203 can be applied to both an AC motor and a DC motor by using DC-AC or reverse conversion (AC-DC conversion) at necessary portions. The various sensors 210 control an engine speed through the vehicle control device 209, or control an opening degree (throttle opening degree) of a throttle valve (not illustrated). The various sensors 210 include a velocity sensor, an acceleration sensor, an engine speed sensor, and the like.

A rotating force of the engine 201 is transmitted to the generator 202, and electric power generated by the generator 202 can be stored in the battery 208 by the rotating force.

When the hybrid vehicle 200 is decelerated by a brake mechanism (not illustrated), a resistance force during the deceleration is added to the electric power driving force converter 203 as a rotating force, and regenerative electric power generated by the electric power driving force converter 203 due to this rotating force is stored in the battery 208.

By being connected to an external power source of the hybrid vehicle 200 through the charging port 211, the battery 208 receives electric power from the external power source by using the charging port 211 as an input port, and can store the received electric power.

Although not illustrated, an information processing device for performing information processing about vehicle control on the basis of information about a non-aqueous electrolyte secondary battery may be included. Examples of such an information processing device include an information processing device for displaying a battery remaining amount on the basis of information about the remaining amount of the non-aqueous electrolyte secondary battery.

Note that the above description has been made by exemplifying a series hybrid car travelling with a motor using electric power generated by a generator driven by an engine or electric power obtained by temporarily storing the generated electric power in a battery. However, the present technology can be applied effectively also to a parallel hybrid car using both an engine and a motor as a driving source and appropriately switching three methods of travelling only by the engine, travelling only by the motor, and travelling by both the engine and the motor to be used. Furthermore, the present technology can be applied effectively also to a so-called electric vehicle travelling by driving only with a driving motor without use of an engine.

EXAMPLES

Hereinafter, the present technology will be described specifically with Examples, but the present technology is not limited only to the Examples.

Example 1

(Step for Manufacturing First Positive Electrode Active Material)

A first positive electrode active material was manufactured as follows. First, a precursor was manufactured by precipitating a salt of a hydroxide by a coprecipitation method industrially performed generally. $CoSO_4 \cdot 7H_2O$ (manufactured by Nihon Kagaku Sangyo Co., Ltd.), $MnSO_4 \cdot H_2O$ (manufactured by Nihon Kagaku Sangyo Co., Ltd.), $NiSO_4 \cdot 6H_2O$ (manufactured by Seido Chemical Industry Co., Ltd.), and $Al(NO_3)_3 \cdot 9H_2O$ as transition metal raw materials, and NaOH as an alkali raw material were weighed such that a metal ratio thereof was a ratio indicated in Table 1, and were dissolved in water to be used. In addition, ammonia water (manufactured by Kanto Chemical Co., Inc.) was used as a chelating agent such that these materials were stably coprecipitated.

Specifically, the precursor was manufactured by the coprecipitation method as follows. The alkali raw material was dropwise added to the transition metal raw materials and the chelating agent at constant flow rates such that a pH became a certain value while materials in a 0.5 L reaction tank were stirred at 1000 rpm. A precipitate was collected by overflow from the reaction tank at 50° C. Thereafter, the collected precipitate was filtered and was sufficiently dried. A precursor was thereby obtained.

Subsequently, the resulting precursor was mixed with $Li_2CO_3$ (manufactured by The Honjo Chemical Corporation, UF-200) as a Li source so as to obtain an atomic ratio of Li:Mn:Co:Ni:Al=1.13:0.522:0.174:0.174:0.01). The resultant mixture was fired at 850° C. for 12 hours in the air. A lithium composite oxide having an average composition $(Li_{1.13}[Mn_{0.6}Co_{0.2}Ni_{0.2}]_{0.87}Al_{0.01}O_2)$ indicated in Table 1 was thereby obtained. This lithium composite oxide was used as the first positive electrode active material.

(Step for Manufacturing Second Positive Electrode Active Material)

A second positive electrode active material was manufactured as follows. A lithium composite oxide having an average composition $(Li_{1.13}[Mn_{0.6}Co_{0.2}Ni_{0.2}]_{0.87}Al_{0.01}O_2)$ indicated in Table 1 was obtained in a similar manner to the step for manufacturing the first positive electrode active material except that the conditions for firing the mixture were 1050° C. and 12 hours in place of 850° C. and 12 hours. This lithium composite oxide was further ground with a planetary mill at 1000 rpm for 15 minutes. This ground lithium composite oxide was used as the second positive electrode active material.

(Step for Mixing First and Second Positive Electrode Active Materials)

By mixing the first positive electrode active material M1 and the second positive electrode active material M2 obtained as described above such that a weight ratio (M1:M2) was 80:20, a positive electrode active material was obtained.

(Design of Non-Aqueous Electrolyte Secondary Battery)

A non-aqueous electrolyte secondary battery was manufactured as follows using the positive electrode active material obtained in such a manner as described above. Incidentally, a one-sided coated sample for each of the following positive electrode and negative electrode was manufactured separately, and a charge capacity for each of the positive electrode and the negative electrode was determined with a counter electrode Li coin cell of each of the electrodes. Specifically, in a case of the positive electrode, an electric capacity was measured when charging was performed up to a first charging voltage in each Example. In a case of the negative electrode, an electric capacity was measured when charging was performed at a low voltage until a current value became 1/10 of a constant current value after charging at a constant current at 0 V. A charge capacity per thickness of a mixture of each of the electrodes was determined. Using this value, a thickness of each of the positive electrode and the negative electrode was adjusted by solids of a positive electrode mixture slurry and a negative electrode mixture slurry, a coating speed thereof, or the like such that (charge capacity of positive electrode/charge capacity of negative electrode) was 0.5.

(Step for Manufacturing Positive Electrode)

A positive electrode was manufactured as follows. First, 90% by weight of the mixed positive electrode active material, 5% by weight of amorphous carbon powder (Ketjen black), and 5% by weight of polyvinylidene fluoride (PVdF) were mixed to prepare a positive electrode mixture. This positive electrode mixture was dispersed in N-methyl-2-pyrrolidone (NMP) to prepare a positive electrode mixture slurry. Thereafter, this positive electrode mixture slurry was applied uniformly to both surfaces of a strip-shaped aluminum foil (positive electrode current collector) to form a coated film. Subsequently, this coated film was dried by hot-air, and then was subjected to compression molding with a roll press machine (roll temperature 130° C., linear pressure 0.7 t/cm, press speed 10 m/min) to form a positive electrode sheet. Subsequently, this positive electrode sheet was cutout into a strip of 48 mm×300 mm to manufacture a positive electrode. Subsequently, a positive electrode lead was attached to an exposed portion of a positive electrode current collector in the positive electrode.

(Method for Calculating Average Porosity in Particle and Average Particle Diameter)

The average porosity V1 in a particle of the first positive electrode active material and the average particle diameter D1 thereof were determined as follows. First, a cross-section of a positive electrode after pressing was manufactured using an ion milling system E-3500 manufactured by HITACHI Ltd. Using a scanning electron microscope (SEM) manufactured by HITACHI Ltd., a cross-sectional image thereof (hereinafter referred to as "cross-sectional SEM image") was taken at 3 kV at a magnification of 5000. Thereafter, using an image analysis software ImageJ, ten first positive electrode active material particles were selected at random from the cross-sectional SEM image, and a porosity in each of these particles and a particle diameter thereof were calculated. This operation was performed for cross-sectional SEM images on 20 sheets. By simply averaging (arithmetically averaging) the resulting porosities in a particle, the average porosity V1 in a particle was determined. In addition, by simply averaging (arithmetically averaging) the resulting diameters, the average particle diameter D1 was determined.

The average porosity V2 in a particle of the second positive electrode active material particle and the average particle diameter D2 thereof were determined in a similar manner to the manner in which the average porosity V1 in a particle of the first positive electrode active material and the average particle diameter D1 thereof were determined except that the second positive electrode active material particle was selected from the cross-sectional SEM image.

Figure 8A:
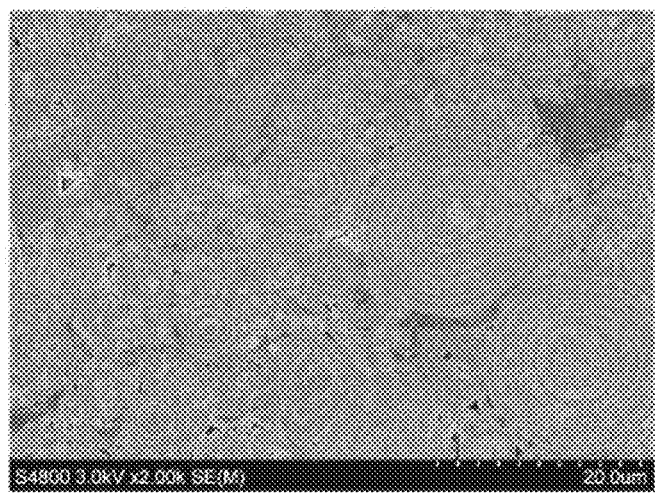
FIG. 8A illustrates an SEM image of a positive electrode active material layer in Example 1.
Figure 8B:
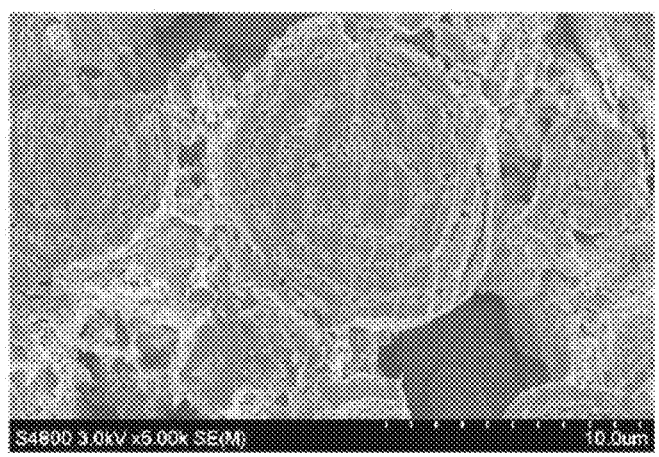
FIG. 8B illustrates an SEM image of a positive electrode active material particle in Example 1.

FIGS. 8A and 8B illustrate cross-sectional SEM images of the positive electrode in Example 1. FIGS. 8A and 8B indicate that a void having an annual ring form is formed in the first positive electrode active material particle.

(Step for Manufacturing Negative Electrode)

A negative electrode was manufactured as follows. First, by mixing SiO particles having an average particle diameter of 7 μm as a negative electrode active material and an NMP solution containing 20 wt % of a polyimide binder such that a weight ratio (SiO particles:NMP solution) was 7:2, a negative electrode mixture slurry was manufactured. Subsequently, the negative electrode mixture slurry was applied to both surfaces of a copper foil (negative electrode current collector) having a thickness of 15 μm using a bar coater having a gap of 35 μm to form a coated film, and this coated film was dried at 80° C. Subsequently, the coated film was subjected to compression molding with a roll press machine, and then was heated at 700° C. for three hours to form a negative electrode sheet. This negative electrode sheet was cut out into a strip of 50 mm×310 mm to manufacture a negative electrode. Subsequently, a negative electrode lead was attached to an exposed portion of a negative electrode current collector in the negative electrode.

(Step for Manufacturing Laminate Cell)

First, the manufactured positive electrode and negative electrode were brought into close contact with each other through a separator formed of a microporous polyethylene film having a thickness of 25 μm, and were wound in a longitudinal direction thereof. A protective tape was stuck to an outermost peripheral portion thereof to manufacture a flat wound electrode body. Subsequently, this wound electrode body was disposed in an exterior member. Three sides of the exterior member were thermally fused, and one side was not thermally fused so as to have an opening. As the exterior member, a moisture-resistant aluminum laminate film obtained by laminating a nylon film having a thickness of 25 μm, an aluminum foil having a thickness of 40 μm, and a polypropylene film having a thickness of 30 μm in the order from the outermost layer was used.

(Step for Preparing and Injecting Electrolytic Solution)

First, a mixed solvent obtained by mixing ethylene carbonate (EC) and ethylmethyl carbonate (EMC) so as to have a mass ratio of EC:EMC=5:5 was prepared. Subsequently, lithium hexafluorophosphate ($LiPF_6$) was dissolved in this mixed solvent as an electrolyte salt so as to have a concentration of 1 mol/l to prepare an electrolytic solution. This electrolytic solution was injected from an opening of the exterior member. The remaining one side of the exterior member was thermally fused under reduced pressure to be sealed. A desired secondary non-aqueous electrolyte secondary battery was thereby obtained.

Example 2

A non-aqueous electrolyte secondary battery was manufactured in a similar manner to Example 1 except that the first positive electrode active material M1 and the second positive electrode active material M2 were mixed so as to have a weight ratio (M1:M2) of 90:10.

Example 3

Graphite was used as a negative electrode active material. In addition, the thickness of each of the positive electrode and the negative electrode was adjusted by solids of a positive electrode mixture slurry and a negative electrode mixture slurry, a coating speed thereof, or the like such that (charge capacity of positive electrode/charge capacity of negative electrode) was 0.9. A non-aqueous electrolyte secondary battery was obtained in a similar manner to Example 1 except for these matters.

Example 4

A non-aqueous electrolyte secondary battery was obtained in a similar manner to Example 1 except that silicon (Si) was used as a negative electrode active material.

Example 5

A non-aqueous electrolyte secondary battery was obtained in a similar manner to Example 1 except that grinding conditions in the step for manufacturing the second positive electrode active material were changed, the average particle diameter D2 of the second positive electrode active material was 5.5 [μm], and the average porosity V2 in a particle thereof was 2[%].

Example 6

A non-aqueous electrolyte secondary battery was obtained in a similar manner to Example 1 except that raw materials were mixed such that an atomic ratio was Li:Mn:Co:Ni=1.2:0.48:0.16:0.16 without adding aluminum nitrate nonahydrate ($Al(NO_3)_3 \cdot 9H_2O$).

Example 7

A non-aqueous electrolyte secondary battery was obtained in a similar manner to Example 1 except that grinding conditions in the step for manufacturing the second positive electrode active material were changed, the average particle diameter D2 of the second positive electrode active material was 1.1 [μm], and the average porosity V2 in a particle thereof was 1[%].

Example 8

A non-aqueous electrolyte secondary battery was obtained in a similar manner to Example 1 except that the mixture of the precursor and the Li source was fired in an atmosphere of nitrogen in the steps for manufacturing the first and second positive electrode active materials.

Example 9

A non-aqueous electrolyte secondary battery was obtained in a similar manner to Example 1 except that the temperature of the reaction tank (coprecipitation temperature) was 55° C. in the steps for manufacturing the first and second positive electrode active materials.

Example 10

A non-aqueous electrolyte secondary battery was manufactured in a similar manner to Example 1 except that the firing temperature was 800° C. in the step for manufacturing the first positive electrode active material.

Example 11

A non-aqueous electrolyte secondary battery was obtained in a similar manner to Example 1 except that the firing temperature was 950° C. in the step for manufacturing the second positive electrode active material.

Example 12

A non-aqueous electrolyte secondary battery was obtained in a similar manner to Example 1 except that raw materials were mixed such that an atomic ratio was Li:Mn:Co:Ni:Ti=1.13:0.522:0.261:0.087:0.01.

Example 13

A non-aqueous electrolyte secondary battery was obtained in a similar manner to Example 1 except that the first positive electrode active material M1 and the second positive electrode active material M2 were mixed so as to have a weight ratio (M1:M2) of 60:40.

Example 14

A non-aqueous electrolyte secondary battery was obtained in a similar manner to Example 1 except that sodium carbonate was used as the alkali source in the steps for manufacturing the first and second positive electrode active materials. Incidentally, in a positive electrode in Example 14, it was confirmed by a cross-sectional SEM image that an amorphous-shaped void was locally present in the center of the first positive electrode active material particle.

Example 15

A non-aqueous electrolyte secondary battery was obtained in a similar manner to Example 1 except that raw materials were mixed such that an atomic ratio was Li:Mn:Co:Ni:Mg=1.13:0.522:0.261:0.087:0.01.

Example 16

A non-aqueous electrolyte secondary battery was obtained in a similar manner to Example 1 except that the temperature of the reaction tank was 35° C. in the steps for manufacturing the first and second positive electrode active materials.

Comparative Example 1

A non-aqueous electrolyte secondary battery was obtained in a similar manner to Example 1 except that the firing temperature was 950° C. in the steps for manufacturing the first and second positive electrode active materials.

Figure 8C:
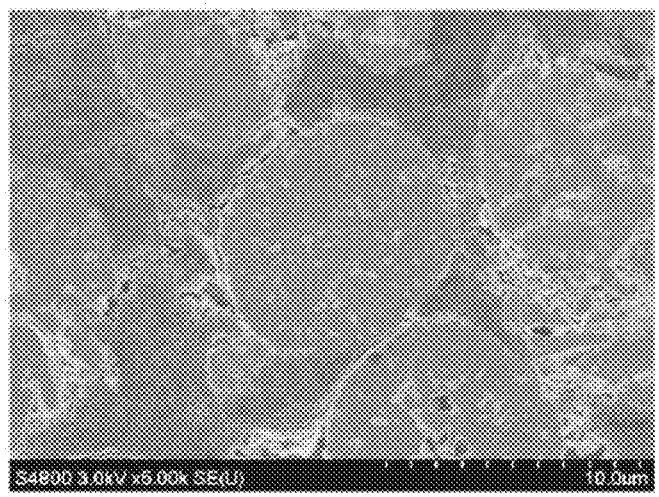
FIG. 8C illustrates an SEM image of a positive electrode active material particle in Comparative Example 1.

FIG. 8C illustrates a cross-sectional SEM image of a positive electrode in Comparative Example 1. FIG. 8C indicates that very small voids are scattered sparsely in the first positive electrode active material particle. In addition, a particle containing a void having a certain size is also observed, but in this case, it is found that the void having a certain size is locally present in the center of the first positive electrode active material particle.

Comparative Example 2

A non-aqueous electrolyte secondary battery was obtained in a similar manner to Example 1 except that grinding conditions in the step for manufacturing the second positive electrode active material were changed, the average particle diameter D2 of the second positive electrode active material was 6.4 [μm], and the average porosity V2 in a particle thereof was 4[%].

Comparative Example 3

A non-aqueous electrolyte secondary battery was obtained in a similar manner to Example 1 except that a positive electrode mixture was manufactured without mixing the second positive electrode active material.

Comparative Example 4

A non-aqueous electrolyte secondary battery was obtained in a similar manner to Example 1 except that the temperature of the reaction tank was 60° C. in the steps for manufacturing the first and second positive electrode active materials.

Comparative Example 5

A non-aqueous electrolyte secondary battery was obtained in a similar manner to Example 1 except that the firing temperature was 900° C. in the step for manufacturing the second positive electrode active material.

Comparative Example 6

A non-aqueous electrolyte secondary battery was obtained in a similar manner to Example 1 except that the temperature of the reaction tank was 55° C. and a stirring speed was 600 rpm in the steps for manufacturing the first and second positive electrode active materials.

Comparative Example 7

A non-aqueous electrolyte secondary battery was obtained in a similar manner to Example 1 except that the temperature of the reaction tank was 25° C. in the step for manufacturing the first positive electrode active material.

Comparative Example 8

A non-aqueous electrolyte secondary battery was obtained in a similar manner to Example 1 except that grinding time in the planetary mill was 30 minutes in the step for manufacturing the second positive electrode active material.

(Evaluation of Battery Characteristic)

The non-aqueous electrolyte secondary batteries in Examples 1 to 16 and Comparative Examples 1 to 9 obtained in such a manner as described above were evaluated as follows.

(Initial Volume Energy Density)

An initial volume energy density was determined as follows. First, two cycles of charging and discharging were performed under the following charge-discharge conditions, and a discharge capacity (mAh/g) per weight of a positive electrode active material at a second cycle. Subsequently, by multiplying the measured discharge capacity by a volume density of a positive electrode active material layer (g/cc), the volume energy density (mAh/cc) was calculated.

Charge conditions: environmental temperature 23° C., charge voltage 4.55 V, charge current 0.5 A, charge time 2.5 hours Discharge conditions: environmental temperature 23° C., discharge current 0.2 A, termination voltage 2.0 V (Load Characteristic)

A load characteristic was evaluated as follows. First, charging and discharging were performed under the above charge-discharge conditions, and a discharge capacity was measured at a discharge current of 0.2 A. Subsequently, charging was performed under conditions of a charge current of 0.5 A and charge time of 2.5 hours. Thereafter, discharging was performed under conditions of a discharge current of 2.0 A and a termination voltage of 2.0 V, and a discharge capacity was measured at a discharge current value of 2.0 A. Subsequently, by substituting the measured discharge capacity at a discharge current of 0.2 A and the measured discharge capacity at a discharge current of 2.0 A in the following equation, the load characteristic was determined.

load characteristic [%]=(discharge capacity at discharge current value of 2.0 A)/(discharge capacity at discharge current value of 0.2 A)×100

(Capacity Retention Ratio)

A capacity retention ratio was determined as follows. First, charging and discharging were performed under the above charge-discharge conditions, and a discharge capacity was measured at a first cycle. Subsequently, charging and discharging were repeated under the above charge-discharge conditions, and then a discharge capacity was measured at a 300th cycle. Subsequently, by substituting the measured discharge capacity at the first cycle and the measured discharge capacity at the 300th cycle in the following equation, the capacity retention ratio after 300 cycles was determined.

capacity retention ratio (%) after 300 cycles=(discharge capacity at the 300th cycle/discharge capacity at the first cycle)×100

Table 1 indicates structures and evaluation results of the non-aqueous electrolyte secondary batteries in Examples 1 to 16.

TABLE 1

| | D1 [μm] | D2 [μm] | V1 V2 M1:M2 | V1 [%] | V2 [%] | void of M1 | $Li_{1+a}[Mn_bCo_cNi_{(1-b-c)}]_{(1-a)}M3_dO_{(2-e)}$ | | | | | | negative electrode material | volume energy density at second cycle [mAh/cc] | load characteristic [%] | capacity retention ratio after 300 cycles [%] |
|---|---|---|---|---|---|---|---|---|---|---|---|---|---|---|---|---|
| | | | | | | | M3 | a | b | c | d | e | | | | |
| Example 1 | 14.3 | 2.2 | 80:20 | 12 | 3 | present | Al | 0.13 | 0.6 | 0.2 | 0.01 | 0 | SiO | 825 | 83 | 89 |
| Example 2 | 14.3 | 2.2 | 90:10 | 12 | 3 | present | Al | 0.13 | 0.6 | 0.2 | 0.01 | 0 | SiO | 811 | 81 | 84 |
| Example 3 | 14.3 | 2.2 | 80:20 | 12 | 3 | present | Al | 0.13 | 0.6 | 0.2 | 0.01 | 0 | graphite | 744 | 82 | 88 |
| Example 4 | 14.3 | 2.2 | 80:20 | 12 | 3 | present | Al | 0.13 | 0.6 | 0.2 | 0.01 | 0 | Si | 780 | 82 | 87 |
| Example 5 | 14.3 | 5.5 | 80:20 | 12 | 2 | present | Al | 0.13 | 0.6 | 0.2 | 0.01 | 0 | SiO | 788 | 80 | 83 |
| Example 6 | 15.1 | 2.6 | 80:20 | 11 | 1 | present | none | 0.2 | 0.6 | 0.2 | 0 | 0 | SiO | 823 | 80 | 81 |
| Example 7 | 14.3 | 1.1 | 80:20 | 12 | 1 | present | Al | 0.13 | 0.6 | 0.2 | 0.01 | 0 | SiO | 817 | 84 | 88 |
| Example 8 | 13.7 | 1.6 | 80:20 | 14 | 2 | present | Al | 0.13 | 0.6 | 0.2 | 0.01 | 0.2 | SiO | 808 | 81 | 83 |
| Example 9 | 18.8 | 3.1 | 80:20 | 19 | 3 | present | Al | 0.13 | 0.6 | 0.2 | 0.01 | 0 | SiO | 782 | 80 | 82 |
| Example 10 | 15.5 | 2.2 | 80:20 | 25 | 3 | present | Al | 0.13 | 0.6 | 0.2 | 0.01 | 0 | SiO | 787 | 82 | 84 |
| Example 11 | 14.3 | 2.9 | 80:20 | 12 | 9 | present | Al | 0.13 | 0.6 | 0.2 | 0.01 | 0 | SiO | 799 | 82 | 85 |
| Example 12 | 14.3 | 2.2 | 80:20 | 12 | 3 | present | Ti | 0.13 | 0.6 | 0.3 | 0.01 | 0 | SiO | 813 | 82 | 86 |
| Example 13 | 14.3 | 2.2 | 60:40 | 12 | 3 | present | Al | 0.13 | 0.6 | 0.2 | 0.01 | 0 | SiO | 771 | 81 | 75 |
| Example 14 | 13.6 | 2.2 | 80:20 | 11 | 3 | locally present (*1) | Al | 0.13 | 0.6 | 0.2 | 0.01 | 0 | SiO | 791 | 83 | 84 |
| Example 15 | 14.3 | 2.1 | 80:20 | 12 | 3 | present | Mg | 0.13 | 0.6 | 0.2 | 0.01 | 0 | SiO | 822 | 83 | 88 |
| Example 16 | 7 | 1.1 | 80:20 | 11 | 1 | present | Al | 0.13 | 0.6 | 0.2 | 0.01 | 0 | SiO | 785 | 85 | 88 |

Table 2 indicates structures and evaluation results of the non-aqueous electrolyte secondary batteries in Comparative Examples 1 to 8.

TABLE 2

| | D1 [μm] | D2 [μm] | M1:M2 | V1 [%] | V2 [%] | void of M1 | $Li_{1+a}[Mn_bCo_cNi_{(1-b-c)}]_{(1-d)}M3_dO_{(2-e)}$ | | | | | | negative electrode material | volume energy density at second cycle [mAh/cc] | load characteristics [%] | capacity retention ratio after 300 cycles [%] |
|---|---|---|---|---|---|---|---|---|---|---|---|---|---|---|---|---|
| | | | | | | | M3 | a | b | c | d | e | | | | |
| Comparative Example 1 | 12.3 | 3.1 | 80:20 | 4 | 3 | hardly present | Al | 0.13 | 0.6 | 0.2 | 0.01 | 0 | SiO | 802 | 69 | 55 |
| Comparative Example 2 | 14.3 | 6.4 | 80:20 | 12 | 4 | present | Al | 0.13 | 0.6 | 0.2 | 0.01 | 0 | SiO | 734 | 78 | 64 |
| Comparative Example 3 | 14.3 | — | 100:0 | 12 | — | present | Al | 0.13 | 0.6 | 0.2 | 0.01 | 0 | SiO | 711 | 79 | 68 |
| Comparative Example 4 | 20.4 | 4.8 | 80:20 | 18 | 6 | present | Al | 0.13 | 0.6 | 0.2 | 0.01 | 0 | SiO | 708 | 73 | 71 |
| Comparative Example 5 | 14.3 | 4.5 | 80:20 | 12 | 13 | present | Al | 0.13 | 0.6 | 0.2 | 0.01 | 0 | SiO | 741 | 80 | 75 |
| Comparative Example 6 | 16.6 | 2.2 | 80:20 | 32 | 2.2 | present | Al | 0.13 | 0.6 | 0.2 | 0.01 | 0 | SiO | 717 | 80 | 72 |
| Comparative Example 7 | 5 | 2.2 | 80:20 | 10 | 3 | present | Al | 0.13 | 0.6 | 0.2 | 0.01 | 0 | SiO | 712 | 84 | 84 |
| Comparative Example 8 | 14.3 | 0.8 | 80:20 | 12 | 1 | present | Al | 0.13 | 0.6 | 0.2 | 0.01 | 0 | SiO | 722 | 83 | 88 |

Note
that, in Tables 1 and 2, M1, M2, D1, D2, V1, V2, and (*1) represent the following.
M1: first positive electrode active material
M2: second positive electrode active material
D1: average particle diameter of first positive electrode active material
D2: average particle diameter of second positive electrode active material
V1: average porosity in first positive electrode active material particle
V2: average porosity in second positive electrode active material particle
(*1): local presence of amorphous-shaped void in center of first positive electrode active material particle Table 1 indicates the following.

In Examples 1 to 16, the average porosity V1 in the first positive electrode active material particle satisfies 10[%]≤V1≤30[%], and the average particle diameter D1 thereof satisfies 6 [μm]≤D1≤20 [μm]. In addition, the average porosity V2 in the second positive electrode active material particle satisfies 0[%]≤V2≤10[%], and the average particle diameter D2 thereof satisfies 1 [μm]≤D2≤6 [μm]. Therefore, an excellent volume energy density, load characteristic, and capacity retention ratio are obtained.

Incidentally, in Examples 1 to 16, studies were made for limited lithium composite oxides having some values for a, b, c, d, and e, but the above effect is not limited these examples. For example, when a compound having an average composition indicated by formula (1) in the first embodiment is used as a lithium composite oxide, the above effect can be exhibited.

In Comparative Example 1, the average porosity V1 in the first positive electrode active material particle is less than 10[%], and therefore a diffusion resistance of lithium (Li) in the first positive electrode active material particle is increased, and a load characteristic and a capacity retention ratio are reduced.

In Comparative Example 2, the average particle diameter D2 of the second positive electrode active material is more than 6 [μm], and therefore a filling property of the positive electrode active material is reduced, a diffusion resistance of Li in the second positive electrode active material particle is increased, and a volume energy density, a load characteristic and a capacity retention ratio are reduced.

In Comparative Example 3, the second positive electrode active material is not used. Therefore, a filling property of the positive electrode active material is not improved, and a volume energy density is reduced. In addition, a positive electrode active material having a large particle diameter tends to have a higher diffusion resistance of Li than a positive electrode active material having a small particle diameter, and to have a poorer load characteristic due to difficulty in release of Li from and insertion of Li into an inside of a particle. Therefore, in Comparative Example 3 in which a weight ratio of the first positive electrode active material having a large particle diameter is 100, the load characteristic is poor. Similarly, the cycle characteristic also tends to be deteriorated because of the diffusion resistance of Li.

In Comparative Example 4, the average particle diameter D1 of the first positive electrode active material is more than 20 [μm]. Therefore, the diffusion resistance of lithium (Li) in the first positive electrode active material particle is increased, and the load characteristic and the capacity retention ratio are reduced. In addition, as the particle diameter of a positive electrode active material having a large particle diameter is larger, both a void in a particle and a void between particles are increased. In addition, the diffusion resistance of Li in the particle is large due to the large particle diameter, and therefore a capacity is not obtained easily. When the particle diameter of the positive electrode active material having a large particle diameter is too large due to a synergistic effect of these two points, a volume capacity density is reduced largely. Therefore, in Comparative Example 4 in which the first positive electrode active material having a large particle diameter has a too large particle diameter, the volume capacity density is reduced.

In Comparative Example 5, the average porosity V2 in the second positive electrode active material particle is more than 13[%]. Therefore, a filling property of the positive electrode active material is reduced, and a volume energy density is reduced.

In Comparative Example 6, the average porosity V1 in the first positive electrode active material particle is more than 30[%]. Therefore, a filling ratio of the positive electrode active material is reduced, and a volume energy density is reduced. In addition, in Comparative Example 6, the first positive electrode active material has insufficient structural stability due to a large void, is decomposed after repeated cycles, and is easily isolated from a conductive auxiliary agent. Therefore, it is considered that a cycle characteristic is reduced. The load characteristic is measured at a cycle initial time. Therefore, it is considered that an ion resistance of Li is low due to many voids and reduction of the load characteristic is small.

In Comparative Example 7, the average particle diameter D1 of the first positive electrode active material is less than 6 [μm]. Therefore, the filling ratio of the positive electrode active material is reduced, and the volume energy density is reduced.

In Comparative Example 8, the average particle diameter D2 of the second positive electrode active material is less than 1 [μm]. Therefore, the filling ratio of the positive electrode active material is reduced, and the volume energy density is reduced.

Comparison among the evaluation results in Examples 1, 2, and 13 indicates that a particularly excellent volume energy density, load characteristic, and capacity retention ratio are obtained by the weight ratio between the first positive electrode active material and the second positive electrode active material (first positive electrode active material:second positive electrode active material) of 95:5 or more and 70:30 or less.

Comparison among the evaluation results in Examples 1, 3, and 4 indicates that the volume energy density can be improved more in a case where Si or SiO is used as a negative electrode active material than in a case where graphite is used as a negative electrode active material, and that the volume energy density can be particularly improved in a case where SiO is used.

Comparison between the evaluation results in Examples 1 and 14 indicates that the capacity retention ratio can be improved by a void having an annual ring form.

Hereinabove, embodiments of the present technology have been described specifically. However, the present technology is not limited to the above embodiments, but various modifications based on a technical idea of the present technology can be made.

For example, the configurations, the methods, the processes, the forms, the materials, the numerical values, and the like exemplified in the above embodiments are only examples, and a structure, a method, a process, a form, a material, a numerical value, and the like different therefrom may be used, as necessary.

In addition, the configurations, the methods, the processes, the forms, the materials, the numerical values, and the like in the above embodiments can be combined to each other as long as not departing from the gist of the present technology.

In addition, in the above embodiments, a case where a lithium-excess positive electrode is used as a positive electrode has been exemplified. However, the positive electrode is not limited to this example, but an electrode used in a general lithium-ion secondary battery as a positive electrode may be used.

In addition, in the above embodiments, an example in which the present technology has been applied to a battery having a wound structure has been described. However, the structure of the battery is not limited thereto, but the present technology can be applied to a battery having a structure in which a positive electrode and a negative electrode are folded or stacked, or the like.

In addition, in the above embodiments and modified examples thereof, an example in which the present technology is applied to a cylinder type battery or a flat type battery has been described. However, the shape of the battery is not limited thereto, but the present technology can be applied to a coin type battery, a button type battery, a square type battery, or the like.

In addition, the present technology can use the following configurations.

(1)

A positive electrode containing a first active material and a second active material, in which the first active material and the second active material each contain a lithium composite oxide containing at least manganese (Mn), nickel (Ni), and cobalt (Co) as transition metals, the first active material has a particulate shape, an average porosity V1 in a particle of the first active material satisfies 10[%]≤V1≤30[%], an average particle diameter D1 of the first active material satisfies 6 [μm]≤D1≤20 [μm], the second active material has a particulate shape, an average porosity V2 in a particle of the second active material satisfies 0[%]≤V2≤10[%], and an average particle diameter D2 of the second active material satisfies 1 [μm]≤D2≤6 [μm].

(2)

The positive electrode described in (1), having an average composition of the lithium composite oxide represented by the following formula (1).

$$Li_{1+a}(Mn_bCo_cNi_{1-b-c})_{1-a}M3_dO_{2-e} \quad (1)$$

(Provided that M3 is at least one of aluminum (Al), magnesium (Mg), zirconium (Zr), titanium (Ti), barium (Ba), boron (B), silicon (Si), and iron (Fe), and 0<a<0.25, 0.3≤b<0.7, 0≤c<1−b, 0≤d≤1, and 0≤e≤1 are satisfied.)

(3)

The positive electrode described in (1) or (2), in which the first active material has a void distributed throughout an inside of the particle.

(4)

The positive electrode described in (1) or (2), in which the first active material has a void having an annual ring shape in the particle.

(5)

The positive electrode described in any one of (1) to (4), in which the weight ratio between the first positive electrode active material and the second positive electrode active material (the first positive electrode active material:the second positive electrode active material) is 95:5 or more and 70:30 or less.

(6)

The positive electrode described in (2), in which M3 in formula (1) above is least one of aluminum (Al), magnesium (Mg), and titanium (Ti).

(7)

A battery containing a positive electrode, a negative electrode, and an electrolyte, in which the positive electrode is a positive electrode described in any one of (1) to (6).

(8)

The battery described in (7), in which the negative electrode contains at least one of silicon (Si) and tin (Sn).

(9)
The battery described in (7), in which the negative electrode contains silicon oxide.

(10)
The battery described in any one of (7) to (9), in which an open-circuit voltage in a full charge state per a pair of the positive electrode and the negative electrode is 4.4V or more and 6.00 V or less.

(11)
A battery pack including the battery described in any one of (7) to (10).

(12)
An electronic device including the battery described in any one of (7) to (10) and receiving electric power from the battery.

(13)
An electric vehicle provided with the battery described in any one of (7) to (10), a converter for converting electric power supplied from the battery into a driving force of a vehicle, and a controller for performing information processing on vehicle control on the basis of information on the battery.

(14)
An electricity storage device including the battery described in any one of (7) to (10) and supplying electric power to an electronic device connected to the battery.

(15)
The electricity storage device described in (14), including an electric power information control device for transmitting a signal to or receiving a signal from another device via a network, and performing charge-discharge control of the battery on the basis of information received by the electric power information control device.

(16)
An electric power system including the battery described in any one of (7) to (10), in which the electric power system receives electric power from the battery, or electric power is supplied from a power generating device or an electric power network to the battery.

REFERENCE SIGNS LIST 11 battery can
12, 13 insulating plate
14 battery lid
15 safety valve mechanism
15A disk plate
16 positive temperature coefficient element
17 gasket
20 wound electrode body
21 positive electrode
21A positive electrode current collector
21B positive electrode active material layer
22 negative electrode
22A negative electrode current collector
22B negative electrode active material layer
23 separator
24 center pin
25 positive electrode lead
26 negative electrode lead

The invention claimed is:
1. A positive electrode, containing:
a first active material; and
a second active material,
wherein
the first active material and the second active material each contain a lithium composite oxide containing at least manganese (Mn), nickel (Ni), and cobalt (Co) as transition metals,
the first active material has a particulate shape, an average porosity V1 in a particle of the first active material satisfies $11[\%] \leq V1 \leq 25[\%]$, and an average particle diameter D1 of the first active material satisfies $7\ [\mu m] \leq D1 \leq 18.8\ [\mu m]$, and
the second active material has a particulate shape, an average porosity V2 in a particle of the second active material satisfies $1[\%] \leq V2 \leq 9[\%]$, and an average particle diameter D2 of the second active material satisfies $1.1\ [\mu m] \leq D2 \leq 5.5\ [\mu m]$.

2. The positive electrode according to claim 1, wherein the first active material has a void having an annual ring shape in the particle.

3. The positive electrode according to claim 1, wherein a weight ratio between the first active material and the second active material is 95:5 or more and 70:30 or less.

4. The positive electrode according to claim 1, wherein the first active material has a void distributed throughout an inside of the particle.

5. The positive electrode according to claim 4, wherein the void has a plurality of annular void layers of different diameters that surround a center of the particle of the first active material.

6. A battery, comprising:
a positive electrode;
a negative electrode; and
an electrolyte, wherein
the positive electrode contains a first active material and a second active material,
the first active material and the second active material each contain a lithium composite oxide containing at least manganese (Mn), nickel (Ni), and cobalt (Co) as transition metals,
the first active material has a particulate shape, an average porosity V1 in a particle of the first active material satisfies $11[\%] \leq V1 \leq 25[\%]$, and an average particle diameter D1 of the first active material satisfies $7\ [\mu m] \leq D1 \leq 18.8\ [\mu m]$, and
the second active material has a particulate shape, an average porosity V2 in a particle of the second active material satisfies $1[\%] \leq V2 \leq 9[\%]$, and an average particle diameter D2 of the second active material satisfies $1.1\ [\mu m] \leq D2 \leq 5.5\ [\mu m]$.

7. The battery according to claim 6, wherein the negative electrode contains at least one of silicon (Si) or tin (Sn).

8. The battery according to claim 6, wherein the negative electrode contains silicon oxide.

9. The battery according to claim 6, wherein an open-circuit voltage in a full charge state of a pair of the positive electrode and the negative electrode is in a range of 4.4 V to 6.00 V.

10. A battery pack, comprising:
a battery containing:
a positive electrode;
a negative electrode; and
an electrolyte, wherein
the positive electrode contains a first active material and a second active material,
the first active material and the second active material each contain a lithium composite oxide containing at least manganese (Mn), nickel (Ni), and cobalt (Co) as transition metals, the first active material has a particulate shape, an average porosity V1 in a particle of the first active material satisfies 11[%]≤V1≤25[%], and an average particle diameter D1 of the first active material satisfies 7 [μm]≤D1≤18.8 [μm], and the second active material has a particulate shape, an average porosity V2 in a particle of the second active material satisfies 1[%]≤V2≤9[%], and an average particle diameter D2 of the second active material satisfies 1.1 [μm]≤D2≤5.5 [μm].

11. An electronic device, comprising:
a battery containing:
  a positive electrode;
  a negative electrode; and
  an electrolyte, wherein
    the positive electrode contains a first active material and a second active material,
    the first active material and the second active material each contain a lithium composite oxide containing at least manganese (Mn), nickel (Ni), and cobalt (Co) as transition metals,
    the first active material has a particulate shape, an average porosity V1 in a particle of the first active material satisfies 11[%]≤V1≤25[%], and an average particle diameter D1 of the first active material satisfies 7 [μm]≤D1≤18.8 [μm],
    the second active material has a particulate shape, an average porosity V2 in a particle of the second active material satisfies 1[%]≤V2≤9[%], and an average particle diameter D2 of the second active material satisfies 1.1 [μm]≤D2≤5.5 [μm], and
    the electronic device is configured to receive electric power from the battery.

12. An electric vehicle, comprising:
a battery;
a converter configured to convert electric power supplied from the battery into a driving force of the electric vehicle; and
a controller configured to process information for vehicle control based on information of the battery, wherein
  the battery contains:
    a positive electrode;
    a negative electrode; and
    an electrolyte, wherein
      the positive electrode contains a first active material and a second active material,
      the first active material and the second active material each contain a lithium composite oxide containing at least manganese (Mn), nickel (Ni), and cobalt (Co) as transition metals,
      the first active material has a particulate shape, an average porosity V1 in a particle of the first active material satisfies 11[%]≤V1≤25[%], and an average particle diameter D1 of the first active material satisfies 7 [μm]≤D1≤18.8 [μm], and
      the second active material has a particulate shape, an average porosity V2 in a particle of the second active material satisfies 1[%]≤V2≤9[%], and an average particle diameter D2 of the second active material satisfies 1.1 [μm]≤D2≤5.5 [μm].

13. An electricity storage device, comprising:
a battery containing:
  a positive electrode;
  a negative electrode; and
  an electrolyte, wherein
    the positive electrode contains a first active material and a second active material,
    the first active material and the second active material each contain a lithium composite oxide containing at least manganese (Mn), nickel (Ni), and cobalt (Co) as transition metals,
    the first active material has a particulate shape, an average porosity V1 in a particle of the first active material satisfies 11[%]≤V1≤25[%], and an average particle diameter D1 of the first active material satisfies 7 [μm]≤D1≤18.8 [μm],
    the second active material has a particulate shape, an average porosity V2 in a particle of the second active material satisfies 1[%]≤V2≤9[%], and an average particle diameter D2 of the second active material satisfies 1.1 [μm]≤D2≤5.5 [μm], and
    the electricity storage device is configured to supply electric power to an electronic device connected to the battery.

14. The electricity storage device according to claim 13, further comprising an electric power information control device configured to transmit a first signal to or receive a second signal from another device via a network, wherein the electricity storage device is configured to control charge-discharge of the battery based on information received by the electric power information control device.

15. An electric power system, comprising:
a battery containing:
  a positive electrode;
  a negative electrode; and
  an electrolyte, wherein
    the positive electrode contains a first active material and a second active material,
    the first active material and the second active material each contain a lithium composite oxide containing at least manganese (Mn), nickel (Ni), and cobalt (Co) as transition metals,
    the first active material has a particulate shape, an average porosity V1 in a particle of the first active material satisfies 11[%]≤V1≤25[%], and an average particle diameter D1 of the first active material satisfies 7 [μm]≤D1≤18.8 [μm],
    the second active material has a particulate shape, an average porosity V2 in a particle of the second active material satisfies 1[%]≤V2≤9[%], and an average particle diameter D2 of the second active material satisfies 1.1 [μm]≤D2≤5.5 [μm], and
    the electric power system is configured to receive electric power from the battery, or the electric power is supplied from one of a power generating device or an electric power network to the battery.

* * * * *